United States Patent
Hinoki et al.

(10) Patent No.: US 8,722,253 B2
(45) Date of Patent: May 13, 2014

(54) ELECTRODE COMPRISING PROTECTIVE LAYER FOR LITHIUM ION SECONDARY BATTERY AND LITHIUM ION SECONDARY BATTERY

(71) Applicant: TDK Corporation, Tokyo (JP)

(72) Inventors: Kiyonori Hinoki, Tokyo (JP); Kazutoshi Emoto, Tokyo (JP); Haruka Nishimura, Tokyo (JP); Masahiro Saegusa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 14/014,780

(22) Filed: Aug. 30, 2013

(65) Prior Publication Data

US 2013/0344384 A1  Dec. 26, 2013

Related U.S. Application Data

(62) Division of application No. 12/727,438, filed on Mar. 19, 2010.

(30) Foreign Application Priority Data

| Mar. 25, 2009 | (JP) | 2009-074171 |
| Mar. 25, 2009 | (JP) | 2009-074214 |
| Mar. 25, 2009 | (JP) | 2009-074225 |
| Mar. 25, 2009 | (JP) | 2009-074746 |

(51) Int. Cl.
*H01M 2/14* (2006.01)

(52) U.S. Cl.
USPC ........................................ 429/249; 429/247

(58) Field of Classification Search
USPC ......... 429/209, 224, 215, 216, 249, 248, 247; 428/447; 556/450; 528/21
See application file for complete search history.

(56) References Cited

U.S. PATENT DOCUMENTS

| 4,464,489 | A | | 8/1984 | Noda et al. |
| 4,520,071 | A | | 5/1985 | Noda et al. |
| 4,528,390 | A | * | 7/1985 | Kimura .................. 556/450 |
| 4,548,835 | A | * | 10/1985 | Takahashi et al. ............ 427/123 |
| 5,869,208 | A | * | 2/1999 | Miyasaka ..................... 429/224 |
| 6,004,695 | A | | 12/1999 | Goda et al. |
| 6,365,299 | B1 | | 4/2002 | Miyaki et al. |
| 7,105,251 | B2 | | 9/2006 | Miyaki et al. |
| 2002/0160212 | A1 | * | 10/2002 | Yamashita et al. ............ 428/458 |
| 2003/0049519 | A1 | | 3/2003 | Ishida et al. |

(Continued)

FOREIGN PATENT DOCUMENTS

| JP | A-59-108030 | 6/1984 |
| JP | A-60-221425 | 11/1985 |

(Continued)

*Primary Examiner* — Kenneth Douyette
(74) *Attorney, Agent, or Firm* — Oliff PLC

(57) ABSTRACT

A lithium ion secondary battery containing a pair of electrodes facing each other, and a separator interposed between the electrodes, wherein at least one of the electrodes has a protecting layer, an active-material containing layer, and a collector sequentially from the separator. The protecting layer contains a silicone resin particle having at least one structural unit represented by $RSiO_{1.5}$ and $R_2SiO$, where R represents an alkyl group having 1 to 6 carbon atoms or a phenyl group.

5 Claims, 7 Drawing Sheets

(56) References Cited

U.S. PATENT DOCUMENTS

| | | |
|---|---|---|
| 2004/0072066 A1 | 4/2004 | Cho et al. |
| 2005/0112456 A1* | 5/2005 | Kozu et al. .................. 429/62 |
| 2005/0141170 A1* | 6/2005 | Honda et al. .................. 361/311 |
| 2005/0208383 A1 | 9/2005 | Totsuka et al. |
| 2007/0111014 A1* | 5/2007 | Katsoulis et al. ............. 428/447 |
| 2009/0148761 A1 | 6/2009 | Kikuchi et al. |
| 2009/0197158 A1 | 8/2009 | Ogawa et al. |
| 2009/0220855 A1 | 9/2009 | Shelekhin et al. |
| 2010/0009265 A1 | 1/2010 | Hatayama et al. |

FOREIGN PATENT DOCUMENTS

| | | |
|---|---|---|
| JP | A-7-220759 | 8/1995 |
| JP | 10177077 A * | 6/1998 ............. G04B 37/18 |
| JP | A-11-54147 | 2/1999 |
| JP | A-2006-139978 | 6/2006 |
| JP | A-2007-095344 | 4/2007 |
| JP | A-2008-226566 | 9/2008 |
| WO | WO 97/01870 | 1/1997 |
| WO | WO 2007/023918 A1 | 3/2007 |
| WO | WO 2008/035674 A1 | 3/2008 |

* cited by examiner

ELECTRODE COMPRISING PROTECTIVE LAYER FOR LITHIUM ION SECONDARY BATTERY AND LITHIUM ION SECONDARY BATTERY

This is a divisional of application Ser. No. 12/727,438 filed Mar. 19, 2010, now U.S. Pat. No. 8,557,437, and claims the benefit of Japanese Patent Application Nos. 2009-074171 filed Mar. 25, 2009, 2009-074214 filed Mar. 25, 2009, 2009-074225 filed Mar. 25, 2009, and 2009-074746 filed Mar. 25, 2009. The entire disclosures of the prior applications are hereby incorporated by reference herein in their entirety.

BACKGROUND OF THE INVENTION

1. Field of the Invention

The present invention relates to an electrode for a lithium ion secondary battery and a lithium ion secondary battery.

2. Related Background Art

As a safety measure for a lithium ion secondary battery, a method of forming a protecting layer on the surface of an electrode (negative electrode) has been proposed (see, for example, Japanese Patent Laid-Open No. 7-220759, International Publication No. WO 97/01870 and Japanese Patent Laid-Open No. 11-54147).

The protecting layer is basically formed by depositing a particle. The particle size and particle size distribution, in this case, have an effect upon the characteristics of the battery such as rate characteristics and charge-discharge cycle characteristics, and safety such as internal short circuit caused by dendrite formation. In a conventional protecting layer, an inorganic particle is basically used. When an inorganic particle is used, it is difficult to control the particle size and particle size distribution. Therefore, a small-size inorganic particle is selected to form a protecting layer having a uniform thickness.

The conventional protecting layer is basically formed by depositing an inorganic particle.

The conventional protecting layer is basically formed by depositing an inorganic particle. However, an inorganic particle has a wide particle size distribution. To form a protecting layer having uniform thickness, a small-size inorganic particle is selected.

As a lithium ion secondary battery, one having a pair of electrodes facing each other and a separator interposed between the electrodes is known. In a process for manufacturing such a lithium ion secondary battery, when the separator is broken by e.g., convexoconcave of an electrode surface, short circuit occurs between the electrodes facing each other, generating heat. To prevent occurrence of such a problem, a technique of forming a protecting layer using an inorganic particle and an organic particle on a surface of an active-material containing layer has been proposed (see, for example, Japanese Patent Laid-Open No. 7-220759, International Publication No. WO97/01870 and Japanese Patent Laid-Open No. 11-54147).

SUMMARY OF THE INVENTION

First Object of the Invention

When the protecting layer is formed of a particle having a small particle size, dendrite tends to grow. Because of this, satisfactory rate characteristics, charge-discharge cycle characteristics and safety are A first invention was made in view of the problems of the conventional technique mentioned above and is directed to providing an electrode for a lithium ion secondary battery capable of forming a lithium ion secondary battery sufficiently suppressed in occurrence of internal short circuit due to dendrite growth and excellent in rate characteristics and charge-discharge cycle characteristics, and providing a lithium ion secondary battery using the same.

Second Object of the Invention

Since a protecting layer using an inorganic particle does not have a shutdown function, the safety during a heat-up time is not sufficient. Even if the separator has a shutdown function, a possibility of internal short circuit due to shrinkage (contraction) of the separator still remains. Although safety can be improved by increasing the thickness of the protecting layer, characteristics of a battery such as impedance and rate characteristics tend to deteriorate. On the other hand, even with a protecting layer using an organic particle, it is difficult to obtain a shutdown function and suppress occurrence of internal short circuit due to shrinkage of the protecting layer during a heat-up time, at the same time.

A second invention was made in view of the problems of the conventional technique mentioned above and is directed to providing an electrode for a lithium ion secondary battery capable of forming a lithium ion secondary battery excellent in safety during a heat-up time and in rate characteristics, and sufficiently reduced in impedance, and providing a lithium ion secondary battery using the same.

Third Object of the Invention

When the protecting layer is formed of a particle having small particle size, an electrolytic solution rarely penetrates into the protecting layer, causing a problem of deterioration in characteristics such as rate characteristics of a battery. A protecting layer formed of an inorganic particle does not have a shutdown function. The safety of such a protecting layer during a heat-up time is not sufficient.

On the other hand, even with a protecting layer using an organic particle, it is difficult to provide a shutdown function and suppress occurrence of internal short circuit due to shrinkage (contraction) of the protecting layer during a heat-up time, at the same time. Furthermore, when a shutdown function is provided to the protecting layer by using an organic particle, if a lithium ion secondary battery is used repeatedly, impedance may probably increase.

The invention was made in view of the problems of the conventional technique mentioned above and is directed to providing an electrode for a lithium ion secondary battery capable of forming a lithium ion secondary battery excellent in safety during a heat-up time and in rate characteristics and sufficiently suppressed in increase of impedance at the time of repeated use, and providing a lithium ion secondary battery using the same.

Fourth Object of the Invention

When a protecting layer is formed of an inorganic particle, in order to obtain the protecting layer uniform in thickness, the size of the inorganic particle must be set to be sufficiently smaller than the thickness of the layer. In this case, the interspace between particles becomes narrow, preventing ion migration in an electrolytic solution. As a result, rate characteristics tend to deteriorate. Note that, when the thickness of the protecting layer is nonuniform, impedance disadvantageously increases.

On the other hand, when a protecting layer is formed of an organic particle, if the inner temperature of a battery increases due to overcharge, etc., the separator shrinks (contracts). In addition, since the protecting layer formed of an organic particle does not have sufficient heat resistance, the protecting layer may not sufficiently work. In the circumstances, it has been desired to develop a lithium ion secondary battery capable of sufficiently suppressing deterioration of rate characteristics and short circuit even at high temperatures.

The invention was made in view of the problems of the conventional technique mentioned above and is directed to a lithium ion secondary battery capable of sufficiently suppressing deterioration of rate characteristics and short circuit even at high temperatures.

First Invention

To attain the first object, the first invention provides an electrode for a lithium ion secondary battery having a collector, an active-material layer formed on the collector and a protecting layer formed on the active-material layer, in which the protecting layer contains an organic particle formed of poly(methyl methacrylate) having a crosslinked structure, and the organic particle has an average particle size (D50) of 0.5 to 4.0 μm.

According to the electrode for a lithium ion secondary battery, since a protecting layer is formed of an organic particle, which is formed of poly(methyl methacrylate) having a crosslinked structure and has an average particle size (D50) of 0.5 to 4.0 μm, on the surface of the electrode, a lithium ion secondary battery sufficiently suppressed in occurrence of internal short circuit due to dendrite growth and excellent in rate characteristics and charge-discharge cycle characteristics can be formed, compared to an electrode having a protecting layer formed of a conventional inorganic particle or an organic particle other than the organic particle specified by the present application. Furthermore, use of organic particle specified above provides excellent shutdown function of the protecting layer at high temperatures and can improve safety at high temperatures, compared to an electrode formed of an inorganic particle.

In the electrode for a lithium ion secondary battery according to the first invention, it is preferred that the organic particle has a shape satisfying the conditions expressed by the following expression (1):

$$1.00 \leq (\text{major-axis length/minor-axis length}) \leq 1.30 \quad (1).$$

The organic particles satisfying the conditions of the expression (1) are likely to uniformly align in the protecting layer with no space between particles. As a result, growth of dendrite in the thickness direction of the protecting layer is inhibited; occurrence of internal short circuit can be more sufficiently suppressed; and the rate characteristics and charge-discharge cycle characteristics of a lithium ion secondary battery can be further improved.

The first invention also provides a lithium ion secondary battery having a positive electrode and a negative electrode, in which at least one of the positive electrode and the negative electrode is an electrode having a collector, an active-material layer formed on the collector and a protecting layer formed on the active-material layer; the protecting layer contains an organic particle formed of a poly(methyl methacrylate) having a crosslinked structure; and the organic particle has an average particle size (D50) of 0.5 to 4.0 μm.

According to the lithium ion secondary battery, since it has a negative electrode and/or positive electrode having a protecting layer formed of an organic particle, which is formed of poly(methyl methacrylate) having a crosslinked structure and has an average particle size (D50) of 0.5 to 4.0 μm, on the surface, occurrence of internal short circuit due to dendrite growth is sufficiently suppressed and excellent rate characteristics and excellent charge-discharge cycle characteristics can be obtained, compared to an electrode having a protecting layer formed of a conventional inorganic particle or an organic particle except the organic particle specified by the present application. Furthermore, use of organic particle specified above provides excellent shutdown function of the protecting layer at high temperatures and can improve safety at high temperatures, compared to an electrode formed of an inorganic particle.

In the lithium ion secondary battery of the first invention, it is preferred that the organic particle has a shape satisfying the conditions expressed by the following expression (1):

$$1.00 \leq (\text{major-axis length/minor-axis length}) \leq 1.30 \quad (1).$$

The organic particles satisfying the conditions of the expression (1) are likely to uniformly align in the protecting layer with no space between particles. As a result, growth of dendrite in the thickness direction of the protecting layer is inhibited; occurrence of internal short circuit can be more sufficiently suppressed; and the rate characteristics and charge-discharge cycle characteristics of a lithium ion secondary battery can be further improved.

Furthermore, in the lithium ion secondary battery of the first invention, it is preferred that at least the negative electrode is an electrode having the collector, the active-material layer and the protecting layer.

Occurrence of internal short circuit due to dendrite growth can be more sufficiently suppressed by providing a protecting layer to a negative electrode rather than a positive electrode. This is because dendrite is likely to grow particularly when a material, such as graphite, having a low potential is used as an active material of a negative electrode.

Second Invention

To attain the second object, the second invention provides an electrode for a lithium ion secondary battery having a collector, an active-material layer formed on the collector and a protecting layer formed on the active-material layer, in which the protecting layer contains an organic particle and an inorganic particle; the organic particle has a melting temperature of 100 to 200° C.; the organic particle and the inorganic particle each have an average particle size (D50) of 0.10 to 4.0 μm; and a ratio of a content of the organic particle relative to a content of the inorganic particle in the protecting layer is 1:1 to 1:4, in terms of mass.

Since the protecting layer contains the organic particle and inorganic particle specified above in the aforementioned ratio, a sufficient shutdown function can be provided without degrading characteristics of a battery such as impedance and rate characteristics; at the same time, shrinkage during a heat-up time can be sufficiently suppressed. More specifically, the function the protecting layer provides shutdown since the organic particle melts during a heat-up time; however the inorganic particle does not melt and remains as it is. Since the shape of the protecting layer can be maintained in this manner, internal short circuit can be prevented. Therefore, according to the electrode for a lithium ion secondary battery of the second invention, which has a protecting layer on the surface, a lithium ion secondary battery excellent in safety during a heat-up time and in rate characteristics, and sufficiently reduced in impedance can be formed.

In the electrode for a lithium ion secondary battery of the second invention, it is preferred that the organic particle is a particle formed of polyethylene. By virtue of this, more satisfactory shutdown function of the protecting layer can be obtained, and a lithium: ion secondary battery further improved in safety during a heat-up time can be formed.

The second invention also provides a lithium ion secondary battery having a positive electrode and a negative electrode, in which at least one of the positive electrode and the negative electrode is an electrode having a collector, an active-material layer formed on the collector and a protecting layer formed on the active-material layer; the protecting layer contains an organic particle and an inorganic particle; the organic particle has a melting temperature of 100 to 200° C.; the organic particle and the inorganic particle each have an average particle size (D50) of 0.10 to 4.0 µm; and a ratio of a content of the organic particle relative to a content of the inorganic particle in the protecting layer is 1:1 to 1:4, in terms of mass.

Since the protecting layer contains the organic particle and inorganic particle specified above in the aforementioned ratio, a sufficient shutdown function can be obtained without degrading characteristics of a battery such as impedance and rate characteristics; at the same time, shrinkage during a heat-up time can be sufficiently suppressed. More specifically, the protecting layer provides shutdown since the organic particle melts during a heat-up time; however the inorganic particle does not melt and remains as it is. Since the shape of the protecting layer can be maintained in this manner, internal short circuit can be prevented. Therefore, according to the lithium ion secondary battery of the second invention, which has the negative electrode and/or positive electrode having the protecting layer on the surface, excellent safety during a heat-up time and excellent rate characteristics can be obtained, and further impedance can be sufficiently reduced.

in the lithium ion secondary battery of the second invention, it is preferred that the organic particle is a particle formed of polyethylene. By virtue of this, more satisfactory shutdown function of the protecting layer can be obtained and the safety of lithium ion secondary battery during a heat-up time can be further improved.

Furthermore, in the lithium ion secondary battery of the second invention, it is preferred that at least the negative electrode is an electrode having the collector, the active-material layer and the protecting layer.

The safety during a heat-up time can be further improved by providing the protecting layer to a negative electrode rather than a positive electrode. This is because growth of lithium dendrite particularly on the surface of the negative electrode active-material can be likely to be suppressed.

Third Invention

To attain the third object, the third invention provides an electrode for a lithium ion secondary battery having a collector, an active-material layer formed on the collector and a protecting layer formed on the active-material layer, in which the protecting layer contains a low-melting point organic particle having a melting temperature of 100 to 200° C., and a high-melting point organic particle having a melting temperature of 300° C. or more.

Since the protecting layer mentioned above contains two types of organic particles different in melting temperature, a sufficient shutdown function can be obtained without degrading characteristics of a battery such as impedance and rate characteristics; at the same time, shrinkage during a heat-up time can be sufficiently suppressed. More specifically, the protecting layer provides shutdown since the low-melting point organic particle first melts during a heat-up time; however the high-melting point organic particle does not melt and remains as it is. Since the shape of the protecting layer can be maintained in this manner, internal short circuit can be prevented. Therefore, according to the electrode for a lithium ion secondary battery of the third invention, which has a protecting layer on the surface, a lithium ion secondary battery excellent in safety during a heat-up time and in rate characteristics and sufficiently suppressed in increase of impedance at the time of repeated use can be formed.

In the electrode for a lithium ion secondary battery of the third invention, it is preferred that the low-melting point organic particle is a particle formed of at least one material selected from the group consisting of polyethylene, polypropylene and poly(methyl methacrylate). By virtue of this, more satisfactory shutdown function of the protecting layer can be obtained, and a lithium ion secondary battery more excellent in safety during a heat-up time and more sufficiently suppressed in increase of impedance at the time of repeated use can be formed.

In the electrode for a lithium ion secondary battery of the third invention, it is preferred that the high-melting point organic particle is a particle formed of at least one material selected from the group consisting of polyimide and polytetrafluoroethylene. By virtue of this, the protecting layer is more sufficiently suppressed in shrinkage during a heat-up time and a lithium ion secondary battery further improved in safety during a heat-up time can be formed.

In the electrode for a lithium ion secondary battery of the third invention, it is preferred that the ratio of a content of the low-melting point organic particle relative to a content of the high-melting point organic particle in the protecting layer is 1:1 to 1:4, in terms of mass. Since the protecting layer contains the low-melting point organic particle and the high-melting point organic particle in the aforementioned ratio, providing a shutdown function to the protecting layer, and suppressing occurrence of internal short circuit due to shrinkage of the protecting layer during a heat-up time can be both attained at a high level.

The third invention also provides a lithium ion secondary battery having a positive electrode and a negative electrode, in which at least one of the positive electrode and the negative electrode is an electrode having a collector, an active-material layer formed on the collector and a protecting layer formed on the active-material layer; and the protecting layer contains a low-melting point organic particle having a melting temperature of 100 to 200° C. and a high-melting point organic particle having a melting temperature of 300° C. or more.

Since the protecting layer contains two types of organic particles different in melting temperature, a sufficient shutdown function can be obtained without degrading characteristics of a battery such as impedance and rate characteristics; at the same time, shrinkage during a heat-up time can be sufficiently suppressed. More specifically, the protecting layer provides shutdown since the low-melting point organic particle first melts during a heat-up time; however the high-melting point organic particle does not melt and remains as it is. Since the shape of the protecting layer can be maintained in this manner, internal short circuit can be prevented. Therefore, according to the lithium ion secondary battery of the third invention, which has a negative electrode and/or positive electrode having the protecting layer on the surface, excellent safety during a heat-up time, excellent rate characteristics can be obtained and an increase of impedance at the time of repeated use can be sufficiently suppressed.

in the lithium ion secondary battery of the third invention, it is preferred that the low-melting point organic particle is a particle formed of at least one material selected from the group consisting of polyethylene, polypropylene and poly (methyl methacrylate). By virtue of this, the protecting layer can be provided with more satisfactory shutdown function, and the lithium ion secondary battery can be further improved in safety during a heat-up time and more sufficiently suppressed in an increase of impedance at the time of repeated use.

In the lithium ion secondary battery of the third invention, it is preferred that the high-melting point organic particle is a particle formed of at least one material selected from the group consisting of polyimide and polytetrafluoroethylene. By virtue of this, the protecting layer is more sufficiently suppressed in shrinkage during a heat-up time and the lithium ion secondary battery can be further improved in safety during a heat-up time.

In the lithium ion secondary battery of the third invention, it is preferred that the ratio of a content of the low-melting point organic particle relative to a content of the high-melting point organic particle in the protecting layer is 1:1 to 1:4, in terms of mass. Since the protecting layer contains a low-melting point organic particle and a high-melting point organic particle in the aforementioned ratio, providing a shut-down function to the protecting layer, and suppressing occurrence of internal short circuit due to shrinkage of the protecting layer during a heat-up time can be both attained at a high level. Therefore, safety of the lithium ion secondary battery during a heat-up time can be further improved.

Furthermore, in the lithium ion secondary battery of the third invention, it is preferred that at least the negative electrode is an electrode having the collector, the active-material layer and the protecting layer.

The safety during a heat-up time can be further improved by providing a protecting layer to a negative electrode rather than a positive electrode. This is because growth of dendrite particularly on the surface of the negative electrode active-material can be suppressed.

Fourth Invention

To attain the fourth object, the fourth invention provides a lithium ion secondary battery having a pair of electrodes facing each other and a separator interposed between the electrodes, in which at least one of the electrodes has a protecting layer, an active-material containing layer and a collector sequentially from the separator; the protecting layer contains a silicone resin particle having at least one of structural units represented by $RSiO_{1.5}$ and $R_2SiO$ (in the formula, R represents an alkyl group having 1 to 6 carbon atoms or a phenyl group).

In the fourth invention, it is possible to suppress deterioration of rate characteristics, at the same time, sufficiently suppress short circuit even at high temperatures. The reasons for this are unknown; however, the present inventors consider as follows. However, the reasons are not limited to the followings. Since the protecting layer contains the aforementioned silicone resin particle, even if the thickness of the protecting layer is reduced to 1 to 6 fold as small as the particle size of the silicone resin particle, the protecting layer having a relatively uniform thickness can be formed. Therefore, it is not necessary to reduce the particle size of the particle constituting the protecting layer to be sufficiently small compared to the thickness of the protecting layer in order to form a protecting layer having a uniform thickness. Therefore, as the particle constituting the protecting layer, a particle having a relatively large particle size close to the thickness of the protecting layer can be used. By virtue of this, the interspace between particles is widened, and thus, ions of an electrolytic solution can easily migrate between particles (resistance value of ion migration is reduced). Therefore, the deterioration of rate characteristics is conceivably suppressed. Furthermore, since the protecting layer contains the silicone resin particle, the heat resistance of the protecting layer improves. Consequently, the function of the protecting layer can be maintained even at high temperatures (for example, 400° C.). Therefore, short circuit is conceivably sufficiently suppressed even at high temperatures.

It is preferred that the silicone resin particle has an average particle size of 0.3 to 6.0 μm. In this case, uniformity in thickness of the protecting layer can be further improved. Therefore, an ion of an electrolytic solution can more easily migrate between particles and the deterioration of rate characteristics can be further suppressed.

It is preferred that the protecting layer has a thickness of 0.3 to 6.0 μm. In this case, the deterioration of rate characteristics can be further suppressed.

It is preferred that an aspect ratio, which is a ratio of a major-axis length relative to a minor-axis length of the silicone resin particle, is 1.00 to 1.50. In this case, sizes of particles tend to be equal and thus the uniformity of thickness of the protecting layer can be easily improved. Therefore, the deterioration of rate characteristics can be easily suppressed.

It is preferred that the silicone resin particle is a polymethylsilsesquloxane particle. In this case, the deterioration of rate characteristics can be further suppressed; at the same time, short circuit can be further suppressed even at high temperatures.

Advantages of the First Invention

As described above, according to the first invention, it is possible to provide an electrode for a lithium ion secondary battery capable of forming a lithium ion secondary battery sufficiently suppressed in occurrence of internal short circuit due to dendrite growth and excellent in rate characteristics and charge-discharge cycle characteristics, and provide a lithium ion secondary battery using the same.

Advantages of the Second Invention

According to the second invention, it is possible to provide an electrode for a lithium ion secondary battery capable of forming a lithium ion secondary battery excellent in safety during a heat-up time and in rate characteristics, and sufficiently reduced in impedance, and provide a lithium ion secondary battery using the same.

Advantages of the Third Invention

According to the third invention, it is possible to provide an electrode for a lithium ion secondary battery capable of forming a lithium ion secondary battery excellent in safety during a heat-up time and in rate characteristics, and sufficiently suppressed in increase of impedance at the time of repeated use, and provide a lithium ion secondary battery using the same.

Advantages of the Fourth Invention

According to the fourth invention, it is possible to provide a lithium ion secondary battery capable of sufficiently suppressing the deterioration of rate characteristics and short circuit even at high temperatures.

DESCRIPTION OF THE PREFERRED EMBODIMENTS

Figure 1:
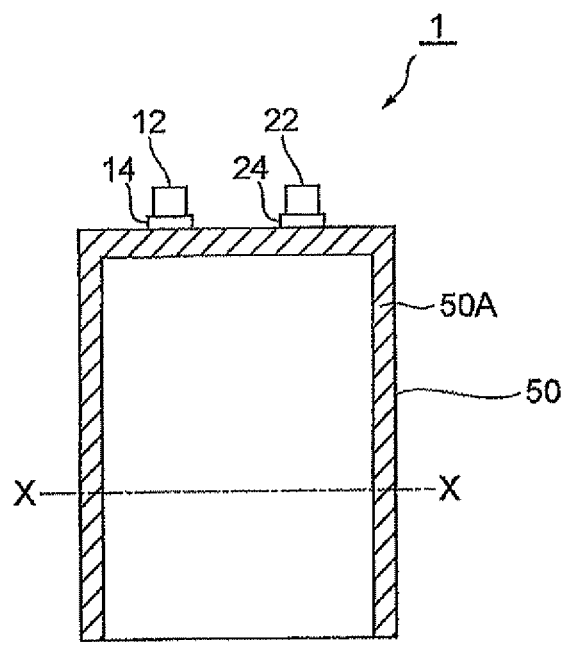
FIG. 1 is a front view of a preferred embodiment of a lithium ion secondary battery according to the present invention.

Preferred embodiments of the present invention will be more specifically described below referring to the accompanying drawings. Note that, in the drawings, the same symbols are used to designate the same or corresponding elements and any further explanation is omitted for brevity's sake. Furthermore, positional relationship like up and down and right and left is the same of that shown in the drawings, if not otherwise specified. Furthermore, the dimensional ratios are not limited to those shown in the drawings.

Figure 2:
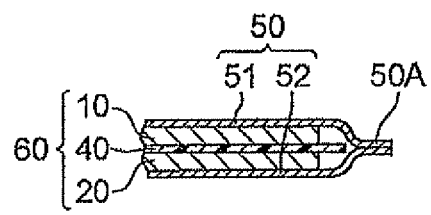
FIG. 2 is a schematic sectional view of the lithium ion secondary battery shown in FIG. 1, taken along the X-X line in FIG. 1.

FIG. 1 is a front view of a preferred embodiment of a lithium ion secondary battery according to the first to third inventions. FIG. 2 is a schematic sectional view of a lithium ion secondary battery 1 shown in FIG. 1, taken along the X-X line.

As shown in FIG. 1 and FIG. 2, the lithium ion secondary battery 1 is constituted essentially of a power generation element 60, which consists of a plate-form negative electrode 10 and a plate-form positive electrode 20 facing each other, and a plate-form separator 40 arranged closely between the negative electrode 10 and the positive electrode 20, an electrolytic solution (non-aqueous electrolytic solution in the embodiment) containing a lithium ion, a case 50 housing these airtight, a lead 12 for the negative electrode, one of the ends of which is electrically connected to the negative electrode 10 and the other end of which protrudes out of the case 50, and a lead 22 for the positive electrode, one of the ends of which is electrically connected to the positive electrode 20 and the other end of which protrudes out of the case 50.

Note that, the "negative electrode" used herein is an electrode defined based on the polarity at the time the battery is electrically discharged, more specifically referred to an electrode releasing electrons by an oxidation reaction during electric discharge. Furthermore, the "positive electrode" is an electrode defined based on the polarity at the time the battery is electrically discharged, more specifically, referred to an electrode receiving electrons by a reductive reaction during electric discharge.

Figure 3:
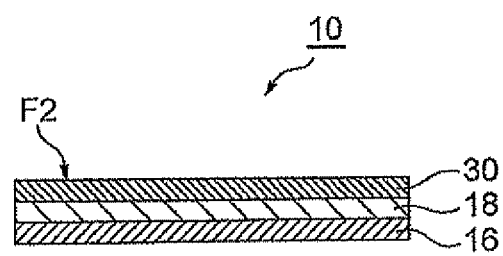
FIG. 3 is a schematic sectional view of a preferred embodiment of a basic structure of a negative electrode of a lithium ion secondary battery.
Figure 4:
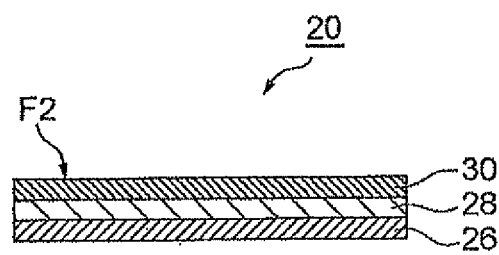
FIG. 4 is a schematic sectional view of a preferred embodiment of a basic structure of a positive electrode of a lithium ion secondary battery.

Furthermore, FIG. 3 and FIG. 4 each are a schematic sectional view of a preferred embodiment of an electrode for a lithium ion secondary battery according to the first to third inventions. More specifically, FIG. 3 is a schematic sectional view of an embodiment of a basic structure of the negative electrode 10 of the lithium ion secondary battery 1. FIG. 4 is a schematic sectional view of an embodiment of a basic structure of the positive electrode 20 of the lithium ion secondary battery 1.

As shown in FIG. 3, the negative electrode 10 is constituted of a collector 16, a negative electrode active-material layer 18 formed on the collector 16 and a protecting layer 30 formed on the negative electrode active-material layer 18. Furthermore, as shown in FIG. 4, the positive electrode 20 is constituted of a collector 26, a positive electrode active-material layer 28 formed on the collector 26 and a protecting layer 30 formed on the positive electrode active-material layer 28.

The protecting layer 30 according to the first invention is a layer formed of an organic particle formed of poly(methyl methacrylate) (PMMA) having a crosslinked structure and having an average particle size (D50) of 0.5 to 4.0 μm containing.

Furthermore, the protecting layer 30 according to the second invention is a layer containing an organic particle and an inorganic particle. In the protecting layer 30, the organic particle has a melting temperature of 100 to 200° C., the organic particle and the inorganic particle each have an average particle size (D50) of 0.10 to 4.0 μm. Furthermore, in the protecting layer 30, the ratio of a content of the organic particle relative to a content of the inorganic particle is 1:1 to 1:4, in terms of mass.

Furthermore, the protecting layer 30 according to the third invention is a layer containing a low-melting point organic particle having melting temperature of 100 to 200° C. and a high-melting point organic particle having a melting temperature of 300° C. or more.

The collector 16 and the collector 26 are not particularly limited as long as they are good conductive materials sufficiently mediating migration of a charge to the negative electrode active-material layer 18 and the positive electrode active-material layer 28, and a collector used in a known lithium ion secondary battery can be used. For example, foil of a metal such as copper and aluminum is mentioned as the collector 16 and the collector 26, respectively.

The negative electrode active-material layer 18 of the negative electrode 10 is essentially formed of a negative electrode active-material and a binder. Note that, it is preferred that the negative electrode active-material layer 18 further contains a conductive auxiliary.

The negative electrode active-material is not particularly limited as long as occlusion and release of a lithium ion, desorption and insertion (intercalation) of a lithium ion, or doping and de-doping of a lithium ion can be reversibly carried out, and a known negative electrode active-material can be used. Examples of such a negative electrode active-material include a carbon material such as natural graphite, synthetic graphite, hardly-graphitized carbon, easily-graphitized carbon and low-temperature baked carbon, a metal such as Al, Si and Sn, capable of chemically reacting with lithium, an amorphous compound principally formed of an oxide such as $SiO$, $SiO_2$, $SiO_x$ and $SnO_2$, lithium titanate ($Li_4Ti_5O_{12}$) and $TiO_2$.

As a binder to be used in the negative electrode 10, a known binder can be used without any particular limitation. Examples thereof include fluorine resins such as polyvinylidene fluoride (PVDF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoro ethylene (PCTFE), an ethylene-chlorotrifluoroethylene copolymer (ECTFE) and polyvinyl fluoride (PVF). To the binder, a functional group such as carboxylic acid may be added in order to mutually bind components such as an active material particle and a conductive auxiliary added if necessary, more sufficiently, and bind these components to a collector, more sufficiently.

Furthermore, other than the aforementioned binders, for example, vinylidene fluoride based fluorine rubber such as vinylidene fluoride-hexafluoropropylene based fluorine rubber (VDF-HFP based fluorine rubber) may be used as a binder.

Furthermore, examples of the binder that may be used other than the aforementioned binders include polyethylene, polypropylene, polyethylene terephthalate, aromatic polyamide, cellulose and a derivative thereof, styrene-butadiene rubber, isoprene rubber, butadiene rubber and ethylene-propylene rubber. Examples of the cellulose derivative include sodium carboxymethylcellulose, hydroxyethylcellulose, cellulose acetate, cellulose nitrate and cellulose sulfate. Furthermore, a thermoplastic elastomer polymer may be used such as a styrene-butadiene-styrene block copolymer and a hydrogenated material thereof; a styrene-ethylene-butadiene-styrene copolymer, and a styrene-isoprene-styrene block copolymer and a hydrogenated material thereof. Furthermore, use may be made of syndiotactic 1,2-polybutadiene, an ethylene-vinyl acetate copolymer and a propylene-α-olefin (carbon atoms: 2 to 12) copolymer, etc. Alternatively, a conductive polymer may be used.

The conductive auxiliary to be used, if necessary, is not particularly limited and a known conductive auxiliary can be used. Examples of the conductive auxiliary include carbon black, a carbon material, powder of a metal such as copper, nickel, stainless steel and iron, a mixture of a carbon material and a metal powder, and a conductive oxide such as ITO.

The content of the negative electrode active-material in the negative electrode active-material layer 18 is preferably 80 to 98% by mass based on the total amount of negative electrode active-material layer 18, and more preferably 85 to 97% by mass. When the content of the active material is less than 80% by mass, energy density tends to decrease, compared to the case where the content falls within the aforementioned range. When the content exceeds 98% by mass, adhesive force is insufficient and cycle characteristics tend to deteriorate, compared to the case where the content falls within the aforementioned range.

The positive electrode active-material layer 28 of the positive electrode 20 is constituted essentially of a positive electrode active-material and a binder. Note that, it is preferred that the positive electrode active-material layer 28 further contains a conductive auxiliary.

The positive electrode active-material is not particularly limited as long as occlusion and release of a lithium ion, desorption and insertion (intercalation) of a lithium ion or doping and de-doping of a lithium ion can be reversibly carried out and a known positive electrode active-material can be used. Examples of such a positive electrode active-material include lithium cobaltate ($LiCoO_2$), lithium nickelate ($LiNiO_2$), lithium-manganese spinel ($LiMn_2O_4$), a compound metal oxide represented by the general formula:

$$LiNi_xCo_yMn_zM_aO_2$$

where x+y+z+a=1 ($0 \leq x \leq 1$, $0 \leq y \leq 1$, $0 \leq z \leq 1$, $0 \leq a \leq 1$), M is at least one element selected from Al, Mg, Nb, Ti, Cu, Zn and Cr, and compound metal oxides such as a lithium vanadium compound ($LiV_2O_5$), an olivine-type $LiMPO_4$ (where M is at least one element selected from Co, Ni, Mn, Fe, Mg, Nb, Ti, Al and Zr or VO) and lithium titanate ($Li_4Ti_5O_{12}$).

As the binder to be used in the positive electrode 20, the same ones to be used in the negative electrode 10 can be used. Furthermore, as the conductive auxiliary to be used, if necessary, in the positive electrode 20, the same conductive auxiliaries to be used in the negative electrode 10 can be used.

The content of the positive electrode active-material in the positive electrode active-material layer 28 is preferably 80 to 98% by mass based on the total amount of positive electrode active-material layer 28, and more preferably 85 to 97% by mass. When the content of the active material is less than 80% by mass, energy density tends to decrease, compared to the case where the content falls within the aforementioned range. When the content exceeds 98% by mass, adhesive force is insufficient and cycle characteristics tend to deteriorate, compared to the case where the content falls within the aforementioned range.

Protecting Layer 30 According to First Invention

Each of the protecting layers 30 according to the first invention of the negative electrode 10 and the positive electrode 20 is a layer containing an organic particle formed of poly(methyl methacrylate) having a crosslinked structure and having an average particle size (D50) of 0.5 to 4.0 μm. The protecting layer 30 may be a layer consisting only of the organic particle or may be a layer containing an organic particle and other materials such as a binder.

The average particle size (D50) of the organic particle formed of a poly(methyl methacrylate) having a crosslinked structure is 0.5 to 4.0 μm, preferably 0.8 to 3.5 μm, and more preferably 1.0 to 3.0 μm. When the average particle size (D50) is less than 0.5 μm, it becomes difficult to sufficiently suppress dendrite growth, with the result that sufficient charge-discharge cycle characteristics and safety cannot be obtained. On the other hand, when the average particle size (D50) exceeds 4.0 μm, sufficient rate characteristics cannot be obtained. The average particle size (D50) of the organic particle is calculated based on the measurement data by an apparatus (name of apparatus: HRA manufactured by Micro Track) for measuring particle-size distribution based on a laser diffraction-dispersion method.

Furthermore, the organic particle preferably has a shape satisfying the conditions represented by the following equation (1):

$$1.00 \leq (\text{major-axis length/minor-axis length}) \leq 1.30 \quad (1).$$

A value of major-axis length/minor-axis length of the organic particle is preferably 1.00 to 1.30, more preferably 1.00 to 1.20, and particularly preferably, 1.00 to 1.10. The organic particle is preferably close to a true sphere. When the value of major-axis length/minor-axis length exceeds 1.30, rate characteristics and charge-discharge cycle characteristics tend to deteriorate.

The value of major-axis length/minor-axis length can be measured by use of an electron microscope. More specifically, in the present invention, the major-axis length/minor-axis length value is obtained by calculation as an average of major-axis length/minor-axis length values of arbitrarily selected 10 organic particles under observation by an electron microscope.

Characteristics of an organic particle formed of a poly (methyl methacrylate) having a crosslinked structure, such as weight average molecular weight, hardness and degree of crosslinking, have an effect upon the characteristics of the protecting layer 30. The weight average molecular weight of the organic particle preferably falls within the range of 100,000 to 1,000,000. When the weight average molecular weight is less than 100,000, an electrolytic solution does not sufficiently permeate into the protecting layer 30. As a result, the amounts of electrolytic solution held by the negative electrode active-material layer 18 and the positive electrode active-material layer 28 decrease. Because of this, impedance tends to increase. When the weight average molecular weight is larger than 1,000,000, the organic particle swells and the size of the organic particle increases excessively. As a result, the distance between the positive electrode 20 and the negative electrode 10 increases. In this case, impedance also tends to increase.

Hardness of the organic particle can be evaluated based on the hardness measured by a durometer in accordance with JIS K7215 test method. Hardness measured by a durometer preferably falls within the range of 70 to 130, and more preferably within the range of 90 to 130. When hardness by a durometer is less than 70, mechanical strength of the protecting layer 30 decreases and the protecting layer 30 tends to be destroyed by dendrite grown in an electrode surface. When hardness by a durometer is larger than 130, the surface of an electrode is scratched during the expansion/contraction of the electrode in the surface charge-discharge cycle. The charge-discharge characteristics tend to deteriorate.

The degree of crosslinking of poly(methyl methacrylate) constituting an organic particle can be estimated by determining a gel fraction. The gel fraction is obtained by soaking an organic particle in a solvent of 25° C. for 24 hours and measuring a reduction of mass. The gel fraction preferably falls within the range of 98.0 to 100%. When the gel fraction is less than 98.0%, the mechanical strength of the protecting layer 30 decreases and the protecting layer 30 tends to be destroyed by dendrite grown in an electrode surface.

As the binder to be used, if necessary, in the protecting layer 30, for example, styrene-butadiene rubber, sodium carboxymethylcellulose, polyvinyl alcohol, PVDF and PTFE are mentioned. Of these, styrene-butadiene rubber and sodium carboxymethylcellulose are preferred in view of adhesiveness to an electrode and controlling of viscosity of a coating solution.

As the material that can be used in the protecting layer 30 other than an organic particle and a binder, for example, an inorganic material such as ceramic is mentioned. Any material may be used, if necessary, for suppressing dendrite, as long as it has high resistance and is not involved in desorption/insertion of a lithium ion during a charge-discharge time.

When the protecting layer 30 contains a binder other than the organic particle, the content of the binder is preferably not less than 1% by mass based on the total amount of protecting layer 30, and more preferably 1.5 to 30% by mass, in view of removal of particles from the protecting layer 30 and permeability of an electrolytic solution, The thickness of the protecting layer 30 is preferably 0.5 to 4.0 μm, and more preferably 1.0 to 4.0 μm. When the thickness of the protecting layer 30 is less than 0.5 μm, the effect of suppressing dendrite growth tends to reduce. When the thickness exceeds 4.0 μm, rate characteristics tend to deteriorate.

Note that, the protecting layer 30 of the negative electrode 10 and the protecting layer 30 of the positive electrode 20 may have the same structure or different structures.

Protecting Layer 30 According to Second Invention

Each of the protecting layers 30 of the negative electrode 10 and the positive electrode 20, according to the second invention is a layer containing an organic particle and an inorganic particle. Note that the protecting layer 30 may be a layer consisting only of an organic particle and an inorganic particle or a layer containing an organic particle, an inorganic particle and other materials such as a binder.

The organic particle is not particularly limited as long as it has a melting temperature of 100 to 200° C. and an average particle size (D50) of 0.10 to 4.0 μm. As a material for the organic particle, for example, polyethylene (PE), polypropylene (PP), poly(methyl methacrylate) (PMMA), an ethylene-acrylic acid copolymer (EA), polyvinyl chloride (PVC), polyester and polyurethane are mentioned. Of these, the organic particle is preferably a particle formed of polyethylene, polypropylene or poly(methyl methacrylate), for more sufficiently obtaining the effect of the invention.

The melting temperature of the organic particle is 100 to 200° C., preferably 102 to 190° C., and more preferably 105 to 180° C. When the inciting temperature of the organic particle falls within the above range, it is possible to obtain a satisfactory shutdown function of the protecting layer 30 during a heat-up time.

Furthermore, the average particle size (D50) of the organic particle is 0.10 to 4.0 μm, preferably 0.20 to 3.3 μm, and more preferably 0.30 to 3.5 μm. When the average particle size (D50) is less than 0.10 μm, permeability of an electrolytic solution into the protecting layer 30 and the active-material layer is inhibited and characteristics of a battery such as rate characteristics deteriorate. On the other hand, when the average particle size (D50) exceeds 4.0 μm, impedance increases.

The inorganic particle is not particularly limited as long as it has an average particle size (D50) of 0.10 to 4.0 μm. As the material for the inorganic particle, for example, alumina, silica and titania are mentioned. Of these inorganic particles, a particle formed of alumina or silica is preferred for sufficiently obtaining the effect of the invention.

Furthermore, the average particle size (D50) of the inorganic particle is 0.10 to 4.0 μm, preferably 0.13 to 3.0 μm, and more preferably 0.15 to 2.0 μm. When the average particle size (D50) is less than 0.10 μm, permeation of an electrolytic solution into the protecting layer 30 and the active-material layer is inhibited and characteristics of a battery such as rate characteristics deteriorate. On the other hand, when the average particle size (D50) exceeds 4.0 μm, impedance increases.

The average particle size (D50) of the organic particle and the inorganic particle is calculated based on the measurement data by an apparatus (type: HRA manufactured by Micro Track) for measuring particle-size distribution based on a laser diffraction-dispersion method.

Furthermore, the ratio of the average particle size (D50) of the organic particle relative to the average particle size (D50) of the inorganic particle (organic-particle average particle size (D50): inorganic particle average particle size (D50)) is preferably 1:2 to 4:1, and more preferably 1:1 to 3:1. When the inorganic particle average particle size (D50) relative to the organic particle average particle size (D50) is larger than the above range, which means that the size of the inorganic particle is large, permeability of an electrolytic solution decreases and impedance tends to increase. On the other hand, when the inorganic particle average particle size (D50) relative to the organic particle average particle size (D50) is smaller than the above range, which means that the size of the inorganic particle is small, internal short circuit is likely to occur during a temperature raising test. In addition, since the size of the organic particle increases, the surface area decreases, decreasing the rate of a shutdown reaction. Consequently, good results may not be likely to be obtained in an overcharge test.

In the protecting layer 30, the ratio of the organic particle content and the inorganic particle content (organic particle content: inorganic particle content) is 1:1 to 1:4 (mass ratio), preferably 1:1.3 to 1:3.2, and more preferably 1:1.5 to 1:3.0. The organic particle content relative to the inorganic particle content is smaller than the above range, sufficient shutdown function of the protecting layer 30 cannot be obtained, with the result that safety during a heat-up time decreases. On the other hand, when the organic particle content relative to the inorganic particle content is larger than the above range, the protecting layer 30 tends to shrink during a heat-up time, with the result that it becomes difficult to sufficiently suppress occurrence of internal short circuit.

As the binder to be used, if necessary, in the protecting layer 30, for example, styrene-butadiene rubber, sodium carboxymethylcellulose, polyvinyl alcohol, PVDF and PTFE are mentioned. Of these, styrene-butadiene rubber and sodium carboxymethylcellulose are preferred in view of adhesiveness to an active-material layer and adjustment of viscosity of a coating solution.

As the other materials that can be used in the protecting layer 30 other than an organic particle, an inorganic particle and a binder, for example, an inorganic material such as ceramic is mentioned. Any material may be used if necessary for suppressing dendrite, as long as it has high resistance and is not involved in desorption/insertion of a lithium ion during a charge-discharge time.

When the protecting layer 30 contains a binder other than an organic particle and an inorganic particle, the content of the binder, preferably not more than 10% by mass based on the total amount of protecting layer 30, and more preferably not more than 8% by mass, for maintaining a shut down effect in an overcharge test and an effect of suppressing occurrence of short circuit due to shrinkage of a separator during a temperature raising test by the protecting layer 30.

The thickness of the protecting layer 30 is preferably 0.5 to 4.0 µm, and more preferably 1.0 to 3.5 µm. When the thickness of the protecting layer 30 is less than 0.5 µm, the effect of suppressing occurrence of internal short circuit by the protecting layer 30 tends to be insufficient. When the thickness exceeds 4.0 µm, rate characteristics deteriorate and impedance tends to increase.

Note that, the protecting layer 30 of the negative electrode 10 and the protecting layer 30 of the positive electrode 20 may have the same structure or different structures.

Protecting Layer 30 According to Third Invention

Each of the protecting layers 30 according to the third invention in the negative electrode 10 and the positive electrode 20 is a layer containing a low-melting point organic particle having a melting temperature of 100 to 200° C. and a high-melting point organic particle having a melting temperature of 300° C. or more. Note that, the protecting layer 30 may be a layer consisting only of a low-melting point organic particle and a high-melting point organic particle, or formed of a low-melting point organic particle, a high-melting point organic particle and other materials such as a binder.

The low-melting point organic particle is not particularly limited as long as it has a melting temperature of 100 to 200° C. As a material for the low-melting point organic particle, for example, polyethylene (PE), polypropylene (PP), poly(methyl methacrylate) (PMMA), an ethylene-acrylic acid copolymer (EA) and polyvinyl chloride (PVC) are mentioned. Of these, the low-melting point organic particle, for sufficiently obtaining the effect of the invention, is preferably a particle formed of at least one material selected from the group consisting of polyethylene, polypropylene and poly(methyl methacrylate).

The melting temperature of the low-melting point organic particle is 100 to 200° C., preferably 102 to 190° C., and more preferably 105 to 180° C. When the melting temperature of the low-melting point organic particle is less than 100° C., the temperature at which the protecting layer 30 provides shutdown is excessively low, unwanted shut down takes place when a lithium ion secondary battery is repeatedly used, with the result that impedance disadvantageously increases. On the other hand, when the melting temperature of the low-melting point organic particle exceeds 200° C., sufficient shutdown function of the protecting layer 30 cannot be obtained and thermal runaway disadvantageously proceeds during a heat-up time.

Furthermore, the average particle size (D50) of the low-melting point organic particle is preferably 0.10 to 6.0 µm, more preferably 0.30 to 5.0 µm, and particularly preferably 0.50 to 4.0 µm. When the average particle size (D50) is less than 0.10 µm, permeation of an electrolytic solution into the protecting layer 30 and the active-material layer is inhibited, characteristics of a battery such as rate characteristics tend to deteriorate. On the other hand, when the average particle size (D50) exceeds 6.0 µm, impedance tends to increase.

The high-melting point organic particle is not particularly limited as long as it has a melting temperature of 300° C. or more. As a material for the high-melting point organic particle, for example, poly benzimidazole (PBI), polyimide (PT), polytetrafluoroethylene (PTFE), a polytetrafluoroethylene-perfluoroalkyl vinyl ether copolymer (PFA), polyetherketone (PEK), polyetheretherketone (PEEK), polyethersulfone (PES), polyamideimide (PAI) and polyetherimide (PEI) are mentioned. Of these, the high-melting point organic particle is preferably a particle formed of at least one material selected from the group consisting of polyamideimide, polyimide and polytetrafluoroethylene, for sufficiently obtaining the effect of the invention.

Note that, a polyimide (PI) particle used in Example 3-5 (described later) can be prepared by an isocyanate method known as a manufacturing method in, for example, Japanese Patent Laid-Open No. 59-108030 and Japanese Patent Laid-Open No. 60-221425.

The high-melting point organic particle has a melting temperature of 300° C. or more, preferably 300 to 350° C., and more preferably 350 to 400° C. When the high-melting point organic particle has a melting temperature of less than 300° C., the protecting layer 30 shrinks during a heat-up time and a problem of internal short circuit tends to occur.

Furthermore, the average particle size (D50) of the high-melting point organic particle is preferably 0.30 to 6.0 µm, more preferably 0.50 to 5.0 µm, and particularly preferably 1.0 to 4.0 µm. When the average particle size (D50) is less than 0.30 µm, permeation of an electrolytic solution into the protecting layer 30 and the active-material layer is inhibited and characteristics of a battery such as rate characteristics tends to deteriorate. On the other hand, when an average particle size (D50) exceeds 6.0 µm, impedance tends to increase.

The average particle size (D50) of the low-melting point organic particle and the high melting point organic particle is calculated based on the measurement data by an apparatus (name of apparatus: HRA manufactured by Micro Track) for measuring particle-size distribution based on a laser diffraction-dispersion method.

Furthermore, the ratio of the average particle size (D50) of the low-melting point organic particle and the average particle size (D50) of the high-melting point organic particle (the average particle size (D50) of the low-melting point organic particle: the average particle size (D50) of the high-melting point organic particle) is preferably 1:1.5 to 1:8, and more preferably 1:2 to 1:6. When the average particle size (D50) of the low-melting point organic particle relative to the average particle size (D50) of the high-melting point organic particle is smaller than the above range, a low-melting point organic particle tends to melt early during a heat-up time. Thus, internal impedance tends to increase. On the other hand, the average particle size (D50) of the low-melting point organic particle relative to the average particle size (D50) of the high-melting point organic particle is larger than the above range, the specific surface area of a particle decreases and thereby a shut down reaction is delayed. Consequently, it seems very possible that good results are not obtained in an overcharge test.

In the protecting layer 30, the ratio of the content of the low-melting point organic particle and the content of the high-melting point organic particle (a low-melting point organic particle content: high-melting point organic particle content) is preferably 1:1 to 1:4 (mass ratio), more preferably 1:1.3 to 1:3.2, and particularly preferably, 1:1.5 to 1:3.0. The low-melting point organic particle content relative to the high-melting point organic particle content is less than the above range, the shutdown function of the protecting layer 30 is lowered and safety during a heat-up time tend to decrease. On the other hand, when the low-melting point organic particle content relative to the high-melting point organic particle content is larger than the above range, the protecting layer 30 is likely to shrink during a heat-up time, and an effect of suppressing occurrence of internal short circuit tends to reduce.

As the binder to be used, if necessary, in the protecting layer 30, for example, styrene-butadiene rubber, sodium carboxymethylcellulose, polyvinyl alcohol, PVDF and PTFE are mentioned. Of these, styrene-butadiene rubber and sodium carboxymethylcellulose are preferred in view of adhesiveness to active-material layer and controlling of viscosity of a coating solution.

As the material that can be used in the protecting layer 30 other than the low-melting point organic particle, the high-melting point organic particle and the binder, for example, an inorganic material such as ceramic is mentioned. Any material may be used if necessary for suppressing dendrite, as long as it has high resistance and is not involved in desorption/insertion of a lithium ion during a charge-discharge time.

When the protecting layer 30 contains a binder other than the low-melting point organic particle and the high-melting point organic particle, the content of the binder is preferably not more than 10% by mass based on the total amount of protecting layer 30, and more preferably not more than 8% by mass, for maintaining a shut down effect during an overcharge test.

The thickness of the protecting layer 30 is preferably 0.3 to 6.0 μm, and more preferably 0.5 to 5.0 μm. When the thickness of the protecting layer 30 is less than 0.3 m, the effect of suppressing occurrence of internal short circuit by the protecting layer 30 tends to be insufficient. When the thickness exceeds 6.0 μm, rate characteristics deteriorate and impedance tends to increase.

Note that, the protecting layer 30 of the negative electrode 10 and the protecting layer 30 of the positive electrode 20 may have the same structure or different structures.

The collector 26 of the positive electrode 20 is electrically connected to an end of the positive-electrode lead 22, for example, formed of aluminum. The other end of the positive-electrode lead 22 extends out of the case 50. On the other hand, the collector 16 of the negative electrode 10 is also electrically connected to an end of the negative-electrode lead 12, for example, made of cupper or nickel. The other end of the negative-electrode lead 12 extends out of the case 50.

The separator 40 arranged between the negative electrode 10 and the positive electrode 20 is not particularly limited as long as it is formed of a porous material having ion transmissivity and electronic insulating property and a separator used in a known lithium ion secondary battery can be used. Example thereof include a laminate of films formed of polyethylene, polypropylene or polyolefin, a stretched film of a mixture of the polymers or nonwoven cloth of a fiber made of at least one selected from the group consisting of cellulose, polyester and polypropylene.

The inner space of the case 50 is filled with an electrolytic solution (not shown) and a part of the electrolytic solution is contained in the negative electrode 10, the positive electrode 20 and the separator 40. As the electrolytic solution, a non-aqueous electrolytic solution dissolving a lithium salt in an organic solvent is used. Examples of the lithium salt include $LiPF_6$, $LiClO_4$, $LiBF_4$, $LiAsF_6$, $LiCF_3SO_3$, $LiCF_3CF)SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$ and $LiN(CF_3CF_2CO)_2$. Note that, these salts may be used singly or in combination with two types or more. Furthermore, the electrolytic solution may be in a gel state by adding a polymer or the like.

Furthermore, as the organic solvent, a solvent used in a known lithium ion secondary battery can be used. Preferable examples thereof include propylene carbonate, ethylene carbonate and diethyl carbonate. These may be used singly or in a mixture of two types or more in an appropriate ratio.

The case 50 is formed, as shown in FIG. 2, of a pair of films (a first film 51 and a second film 52) facing each other. The overlapped edges of the films facing each other are sealed with an adhesive agent or by heat seal to form a seal portion 50A.

The films constituting the first film 51 and the second film 52 are films having flexibility. These films are not particularly limited as long as they have flexibility. For ensuring sufficient mechanical strength and lightness of the case and effectively preventing invasion of water and air into the case 50 from the outside of the case 50 and dissipation of electrolyte components from the interior of the case 50 to the exterior of the case 50, it is preferred to have at least an innermost layer formed of a polymer in contact with power generation element 60 and a metal layer, which is arranged in the opposite surface of the innermost layer in contact with the power generation element.

A portion of the negative-electrode lead 12 in contact with the sealing portion 50A is coated with an insulating material 14 in order to prevent contact between the negative-electrode lead 12 and the metal layer of the case 50. A portion of the positive-electrode lead 22 in contact with the sealing portion 50A is coated with, an insulating material 24 in order to prevent contact between the positive-electrode lead 22 and the metal layer of the case 50. Furthermore, the insulating materials 14, 24 also play a role in improving tightness between the innermost layer of the case 50 and the leads 12, 22.

Next, a method for manufacturing the aforementioned lithium ion secondary battery 1 will be described.

First, the negative electrode 10 and the positive electrode 20 are prepared in preparing the negative electrode 10, a method for forming the negative electrode active-material layer 18 is not particularly limited. For example, components of the negative electrode 10 as described above are mixed and dispersed in a solvent capable of dissolving a binder to prepare a coating solution (e.g., slurry or paste) for forming a negative electrode active-material layer. The solvent is not particularly limited as long as it can dissolve a binder. For example, N-methyl-2-pyrrolidone, N,N-dimethylformamide and water can be used depending upon the type of binder to be used.

Next, the coating solution for forming the negative electrode active-material layer is applied onto the surface of the collector 16, dried, if necessary, rolled or the like, to form the negative electrode active-material layer 18 on the collector 16. A method for applying the coating solution for forming the negative electrode active-material layer to the surface of the collector 16 is not particularly limited and appropriately determined depending upon the material and shape of the collector 16. Examples of the coating method include a metal mask printing method, an electrostatic coating method, dip coating method, a spray coating method, a roll coating method, a doctor blade method, a gravure coating method and a screen printing method.

Next, the protecting layer 30 is formed on the negative electrode active-material layer 18.

Method for Forming the Protecting Layer 30 According to the First Invention

When the protecting layer 30 according to the first invention is a layer containing an organic particle, a binder and other materials if needed, first, the aforementioned components of the protecting layer 30 are mixed and dispersed in a solvent capable of dissolving the binder to prepare a coating solution (e.g., slurry or paste) for forming a protecting layer. The solvent is not particularly limited as long as it dissolves the binder and does not dissolve the organic particle. Examples thereof include water, a compound having a hydroxyl group such as methanol, ethanol, isopropyl alcohol, amyl alcohol, ethylene glycol, glycerin and cyclohexanol; a ketone such as acetone, methyl ethyl ketone, methyl isobutyl ketone and cyclohexanone; an ester such as ethyl acetate, propyl acetate, butyl propionate, butyl butyrate and ethyl lactate, a hydrocarbon such as toluene, xylene, n-butane, cyclohexane and cyclopentane, and an ether such as ethyl ether, butyl ether, ethylpropyl ether, allyl ether, tetrahydrofuran and phenyl ether. These solvents can be used depending upon the type of binder to be used.

Next, the coating solution for forming the protecting layer is applied onto the surface of the negative electrode active-material layer 18 and dried to form the protecting layer 30 on the negative electrode active-material layer 18. At this time, if necessary, the protecting layer 30 may be subjected to a treatment such as a press treatment.

Examples of the press treatment include roll press by means of e.g., a calender roll or flat-plate press. In the present invention, roll press is desirably employed since it is advantageous in forming a highly dense negative electrode active-material layer 18. If there is a risk of e.g., deformation of the negative electrode 10 by performing processing at a high pressure, the processing may be performed by low-pressure thermal press. When thermal press is employed, it is desirable that thermal press is appropriately applied in consideration of heat resistance. Note that, at this time, a preferable temperature is generally 80 to 180° C. The pressure during the pressurization process is preferably controlled such that the porosity of the protecting layer 30 becomes preferably 20 to 40% and more preferably 25 to 35%. The porosity is expressed by:

[1−(density of the protecting layer 30/true density of the protecting layer 30)]×100.

A method for applying a coating solution for forming a protecting layer onto the surface of the negative electrode active-material layer 18 is not particularly limited and may be appropriately determined depending upon the material and shape of the negative electrode active-material layer 18. As the coating method, the same method as employed in applying the coating solution for forming the negative electrode active-material layer may be mentioned.

Furthermore, when the protecting layer 30 consists only of an, organic particle, the protecting layer 30 can be formed by dispersing the organic particle in a solvent to prepare a dispersion solution (coating solution), applying the solution, drying and, if necessary, pressing or the like, in the same manner as mentioned above.

Method for Forming the Protecting Layer 30 According to the Second Invention When the protecting layer 30 according to the second invention is a layer containing an organic particle, an inorganic particle, a binder and, if necessary, other materials, first, components constituting the protecting layer 30 as mentioned above are mixed and dispersed in a solvent capable of dissolving a binder to prepare a coating solution (e.g., slurry or paste) for forming a protecting layer. The solvent is not particularly limited as long as it can dissolve the binder and does not dissolve the organic particle. Examples thereof include water, a compound having a hydroxyl group such as methanol, ethanol, isopropyl alcohol, amyl alcohol, ethylene glycol, glycerin and cyclohexanol; a ketone such as acetone, methyl ethyl ketone, methyl isobutyl ketone and cyclohexanone; an ester such as ethyl acetate, propyl acetate, butyl propionate, butyl butyrate and ethyl lactate, a hydrocarbon such as toluene, xylene, n-butane, cyclohexane and cyclopentane, and an ether such as ethyl ether, butyl ether, ethylpropyl ether, allyl ether, tetrahydrofuran and phenyl ether. These solvents can be used depending upon the type of binder to be used.

Next, a coating solution for forming the protecting layer is applied onto the surface of the negative electrode active-material layer 18 and dried to form the protecting layer 30 on the negative electrode active-material layer 18. At this time, it is preferred that a treatment such as rolling may not be applied to the protecting layer 30 for maintaining the shapes of the organic particle and the inorganic particle; however, if the shape of the organic particle is not affected, a rolling treatment may be applied. A method for applying the coating solution for forming a protecting layer onto the surface of the negative electrode active-material layer 18 is not particularly limited and may be appropriately determined depending upon the material and shape of the negative electrode active-material layer 18. As the coating method, the same method as employed in applying the coating solution for forming the negative electrode active-material layer may be mentioned.

Furthermore, when the protecting layer 30 consists only of the organic particle and the inorganic particle, the protecting layer 30 can be formed by dispersing the organic particle and the inorganic particle in a solvent to prepare a dispersion solution (coating solution), applying the solution, drying and, if necessary, pressing or the like, in the same manner as mentioned above.

Method for Forming Protecting Layer 30 According to the Third Invention

When the protecting layer 30 according to the third invention is a layer containing a low-melting point organic particle, a high-melting point organic particle, a binder and, if necessary, other materials, first, components constituting the protecting layer 30 as mentioned above are mixed and dispersed in a solvent capable of dissolving a binder to prepare a coating solution (e.g., slurry or paste) for forming a protecting layer. The solvent is not particularly limited as long as it can dissolve a binder and does not dissolve the low-melting point organic particle and the high-melting point organic particle. Examples thereof include water, a compound having a hydroxyl group such as methanol, ethanol, isopropyl alcohol, amyl alcohol, ethylene glycol, glycerin and cyclohexanol; a ketone such as acetone, methylethyl ketone, methylisobutyl ketone and cyclohexanone; an ester such as ethyl acetate, propyl acetate, butyl propionate, butyl butyrate and ethyl lactate, a hydrocarbon such as toluene, xylene, n-butane, cyclohexane and cyclopentane and an ether such as ethyl ether, butyl ether, ethylpropyl ether, allyl ether, tetrahydrofuran and phenyl ether. These solvents can be used depending upon the type of binder to be used.

Next, a coating solution for forming the protecting layer is applied onto the surface of the negative electrode active-material layer 18 and dried to form the protecting layer 30 on the negative electrode active-material layer 18. At this time, it is preferred that a treatment such as a rolling may not be applied to the protecting layer 30 for maintaining the shapes of the low-melting point organic particle and the high-melting point organic particle; however, if the shape of the organic particle is not affected, a rolling treatment may be applied. A method for applying the coating solution for forming a protecting layer onto the surface of the negative electrode active-material layer 18 is not particularly limited and may be appropriately determined depending upon the material and shape of the negative electrode active-material layer 18. As the coating method, the same method as employed in applying the coating solution for forming the negative electrode active-material layer may be mentioned.

Furthermore, when the protecting layer 30 consists only of the low-melting point organic particle and the high-melting point organic particle, the protecting layer 30 can be formed by dispersing the organic particles in a solvent to prepare a dispersion solution (coating solution), applying the solution, drying and, if necessary, pressing or the like, in the same manner as mentioned above.

Furthermore, the positive electrode 20 can be prepared in the same manner as in the negative electrode 10.

After the negative electrode 10 and the positive electrode 20 are prepared as mentioned above, the negative-electrode lead 12 and positive-electrode lead 22 are electrically connected to the negative electrode 10 and the positive electrode 20, respectively.

Next, the separator 40 is arranged between the negative electrode 10 and the positive electrode 20 in contact with them (preferably in an unbonded state) to complete formation of the power generation element 60 (a laminate formed of the negative electrode 10, the separator 40 and the positive electrode 20 stacked sequentially in this order). At this time, the separator 40 is arranged such that it comes into contact with the surface F2 of the negative electrode 10 on the side of the protecting layer 30 and the surface F2 of the positive electrode 20 on the side of the protecting layer 30.

Next, the edge portions of the first film 51 and the second film 52 overlapped are sealed by an adhesive agent or by heat seal to prepare the case 50. At this time, a part is allowed to remain unsealed in order to ensure an opening portion for introducing the power generation element 60 into the case 50 (performed in the later step). In this way, the case 50 having an opening portion is obtained.

Into the case 50 having an opening portion, the power generation element 60 to which the negative-electrode lead 12 and the positive-electrode lead 22 are electrically connected is inserted and further an electrolytic solution is injected. Subsequently, the opening portion of the case 50 is sealed in the state where a part of the negative-electrode lead 12 and a part of the positive-electrode lead 22 are inserted in the case 50 to complete formation of the lithium ion secondary battery 1.

In the foregoing, preferred embodiments of the present invention have been described in detail; however, the present invention is not limited to the above embodiments.

For example, in the embodiments above, the case where the negative electrode 10 and the positive electrode 20 both have the protecting layer 30 is described; however, only one of the negative electrode 10 and the positive electrode 20 may have the protecting layer 30. Note that, it is preferred that at least the negative electrode 10 has the protecting layer 30 in order to produce the effect of the invention more sufficiently.

Furthermore, in the embodiments above, a lithium ion secondary battery 1 having a single negative electrode 10 and a single positive electrode 20 is described; however, a lithium ion secondary battery may have at least two negative electrodes 10 and at least two positive electrodes 20 with, a single separator 40 always arranged between them. Furthermore, the shape of the lithium ion secondary battery 1 is not limited to the one shown in FIG. 1. For example, a cylindrical shape may be employed.

Furthermore, the lithium ion secondary battery of the present invention can be used as a power source of automatic micromachines and IC cards, etc. and also used as a dispersed power source arranged on or within a printed substrate.

Other preferred embodiments of a lithium ion secondary battery according to the first to the third inventions will be described.

Figure 5:
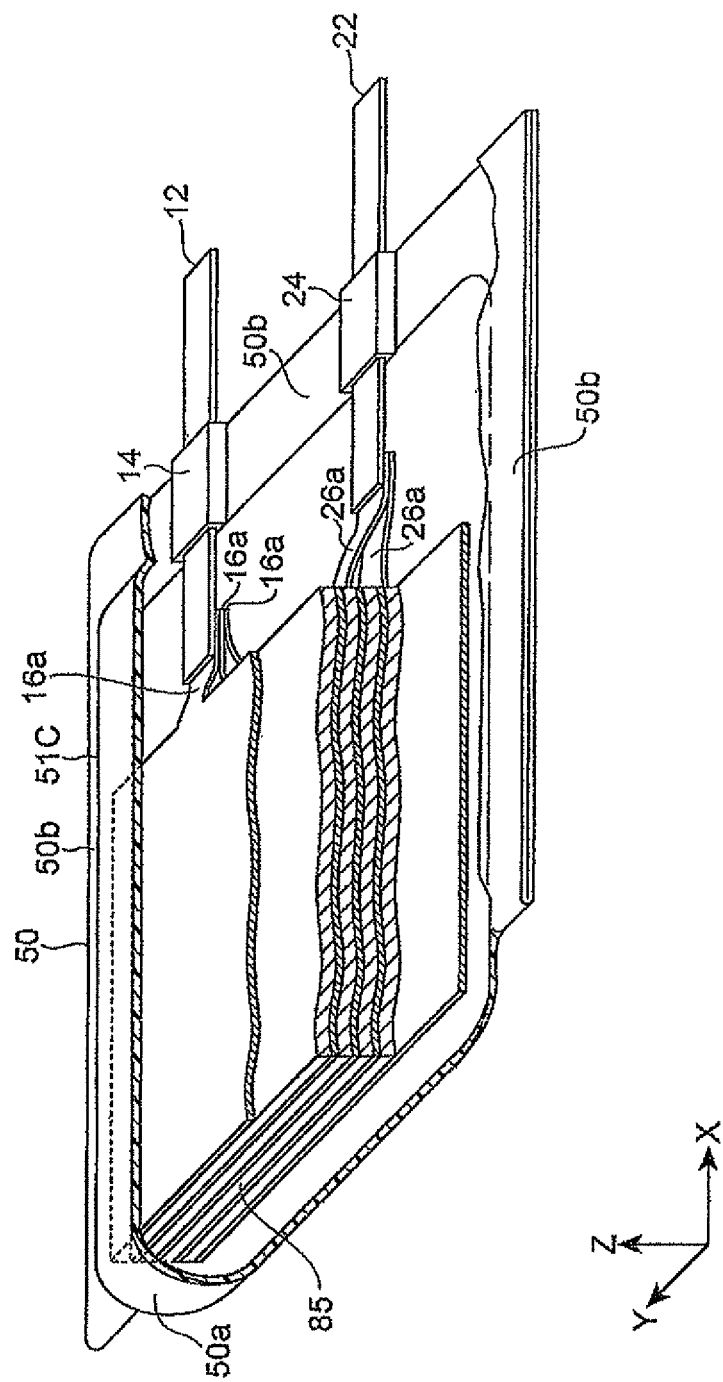
FIG. 5 is a partially cutaway perspective view of another preferred embodiment of a lithium ion secondary battery of the present invention.
Figure 6:
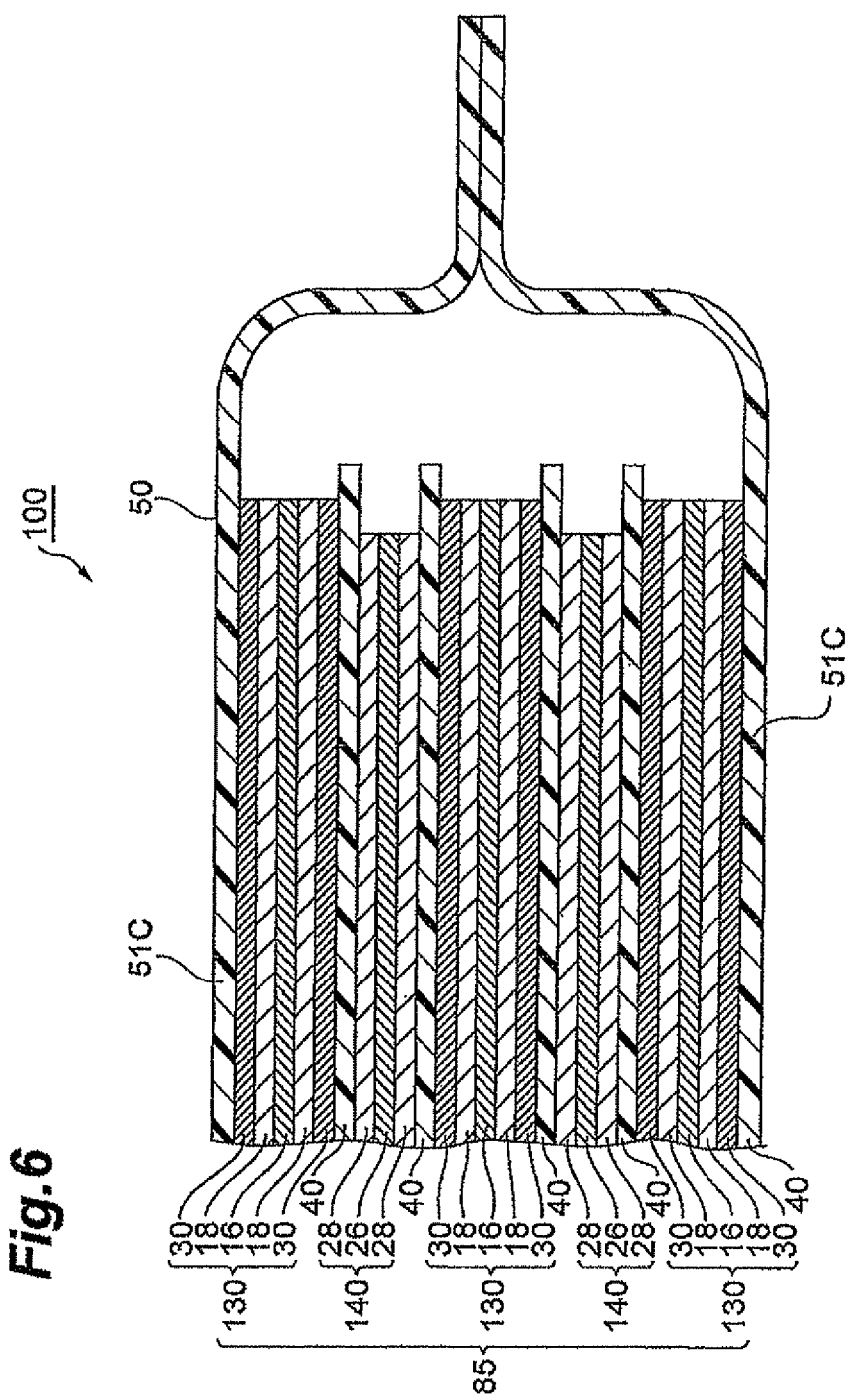
FIG. 6 is a schematic sectional view of the lithium ion secondary battery shown in FIG. 5, taken along the YZ plane.

FIG. 5 shows a partially cutaway perspective view of a lithium ion secondary battery 100 according to another preferred embodiment according to the first to the third inventions. Furthermore, FIG. 6 is a sectional view of the lithium ion secondary battery shown in FIG. 5 taken along the YZ plane. The lithium ion secondary battery 100 according to this embodiment, as shown in FIG. 5 and FIG. 6, is constituted essentially of a laminate structure 85, a case (outer package) 50 housing the laminate structure 85 airtight, a negative-electrode lead 12 and a positive-electrode lead 22 for connecting between the laminate structure 85 and the outer portion of the case 50.

The laminate structure 85, as shown in FIG. 6, is formed of a two-surface coated negative electrode 130, a separator 40, a two surface-coated positive electrode 140, a separator 40, a two-surface coated negative electrode 130, a separator 40, a two surface-coated positive electrode 140, a separator 40 and a two-surface coated negative electrode 130 stacked in this order from the top.

The two-surface coated negative electrode 130 has a collector (negative electrode collector) 16, two negative electrode active-material layers 18 formed on both surfaces of the collector 16 and two protecting layers 30 formed on each of the negative electrode active-material layers 18. The two-surface coated negative electrode 130 is laminated such that the protecting layer 30 is allowed to be in contact with the separator 40.

Furthermore, the two surface-coated positive electrode 140 has a collector (positive electrode collector) 26 and two positive electrode active-material layers 28 formed on both surface of the collector 26. The two surface-coated positive electrode 140 is laminated such that the positive electrode active-material layer 28 is allowed to be in contact with the separator 40.

The inner space of the case 50 is filled with an electrolytic solution (not shown) and partly contained in the negative electrode active-material layer 18, the positive electrode active-material layer 28, the protecting layer 30 and the separator 40.

The edges of the collectors 16, 26 are formed into tongue-shaped portions 16a, 26a each extending outward, as shown in FIG. 5. Furthermore, the negative-electrode lead 12 and the positive-electrode lead 22, as shown in FIG. 5, protrude from the case 50 by way of the sealing portion 50b. The end of the lead 12 within the case 50 is welded to each of the tongue-shaped portions 16a of three collectors 16. The lead 12 is electrically connected to each of the negative electrode active-material layers 18 via the corresponding collector 16. On the other hand, the end of the lead 22 within the case 50 is welded to each of the tongue-shaped portions 26a of two collectors 16. The lead 22 is electrically connected to each of the positive electrode active-material layer 28 via the corresponding collector 26.

Furthermore, the portions of the leads 12, 22 sandwiched by the sealing portions 50b of the case 50 are coated with an insulating material 14, 24 such as a resin, as shown in FIG. 5, to increase sealing performance. Furthermore, the lead 12 and the lead 22 are arranged at a distance in the direction orthogonal with the lamination direction of a laminate structure 85.

The case 50 is, as shown in FIG. 5, formed by folding a rectangular flexible sheet 51C virtually in half lengthwise so as to sandwich the laminate structure 85 vertically at the top and the bottom. Of the edge portions of the sheet 51C folded, three edges excluding a folded portion 50a are sealing portions 50b, which are adhered by heat seal or with an adhesive agent to enclose the laminate structure 85 airtight within the case. Furthermore, the case 50 seals the leads 12, 22 by adhering to insulating materials 14, 24 at the sealing portion 50b.

In the lithium ion secondary battery 100 as shown in FIG. 5 and FIG. 6, the collectors 16, 26, active-material layers 18, 28, protecting layer 30, separator 40, electrolytic solution, leads 12, 22, insulating materials 14, 24 and the case 50 are formed of the same materials as used in the lithium ion secondary battery 1 shown in FIG. 1 to FIG. 4.

Note that, in the lithium ion secondary battery 100 as shown in FIG. 5 and FIG. 6, the laminate structure 85 has 4 secondary battery elements each serving as a single cell, in other words, 4 combinations of negative electrode/separator/positive electrode; however, the number of combination may have more than 4 or 3 or less.

Furthermore, in the embodiment above, it is preferred that the two outermost layers are each formed of a two-surface coated negative electrode 130; however, even if either one or both of the two outermost layers may be formed of a two-layered (one-surface coated) negative electrode(s), the present invention can be carried out.

Furthermore, in the embodiment above, it is preferred that two outermost layers are each formed of a negative electrode; however, even if the two outermost layers are formed of a positive electrode and a negative electrode or a positive electrode and a positive electrode, the present invention can be carried out.

Furthermore, in the embodiment above, a structure where the protecting layer 30 is provided only to a negative electrode is shown as an example; however, the protecting layer 30 may be provided also to a positive electrode. Furthermore, the protecting layer 30 is not provided to the negative electrode and may be provided only to a positive electrode. Moreover, in the embodiment above, a structure where the protecting layer 30 is provided to both surfaces of a two-surface coated negative electrode is shown as an example; however, the protecting layer 30 may be provided one of the negative electrode active-material layers.

Lithium Ion Secondary Battery According to the Fourth Invention

First, the lithium ion secondary battery 200 according to the embodiment will be described referring to FIG. 7.

The lithium ion secondary battery 200 essentially has a laminate 230, a case 250 housing the laminate 230 airtight and a pair of leads 260, 262 connected to the laminate 230.

The laminate 230 has a pair of positive electrode 210 and negative electrode 220 facing each other and separator 218 arranged between the positive electrode 210 and the negative electrode 220. The positive electrode 210 has, sequentially from the side of the separator 218, a positive electrode protecting layer 216, a positive electrode active-material containing layer 214 and a positive electrode collector 212. The negative electrode 220 has, sequentially from the side of the separator 218, a negative electrode protecting layer 226, a negative electrode active-material containing layer 224 and a negative electrode collector 222. The positive electrode protecting layer 216 and a negative electrode protecting layer 226 (hereinafter, described sometimes as protecting layers 216, 226) are in contact with both sides of the separator 218, respectively.

The positive electrode collector 212 may employ, for example, an aluminum foil or a nickel foil. The negative electrode collector 222 may employ, for example, a copper foil or a nickel foil.

The positive electrode active-material containing layer 214 and the negative electrode active-material containing layer 224 contain an active-material particle, a binder and, if necessary, a conductive auxiliary. The positive electrode active-material containing layer 214 has a thickness of, for example, 50 to 140 µm. The negative electrode active-material containing layer 224 has a thickness of, for example, 40 to 130 µm.

As the positive electrode active-material particle, for example, mention may be made of a lithium oxide containing at least one metal selected from the group consisting of Co, Ni and Mn, such as $LiMO_2$ (M represents Co, Ni or Mn), $LiCo_xNi_{1-x}O_2$, $LiMn_2O_4$, $LiCo_xNi_yMn_{1-x-y}O_2$ (where, x and y each exceed 0 and less than 1). $LiCo_xNi_yMn_{1-x-y}O_2$ is particularly preferable.

As the negative electrode active-material particle, for example, mention is made of a carbon particle capable of absorbing or desorbing (releasing) a lithium ion (intercalate/deintercalate, or doping/dedoping) such as graphite, hardily-graphitized carbon, easily-graphitized carbon and low-temperature baked carbon, a particle of a composite material of carbon and a metal, a metal particle capable of reacting with lithium, such as Al, Si and Sn, and a particle containing lithium titanate ($Li_4Ti_5O_{12}$) or the like.

The binder is not particularly limited as long as it can bind the aforementioned active-material particle and a conductive auxiliary to a collector. A known binder can be used. Examples of the binder include a fluorine resin such as polyvinylidene fluoride (PVDF), polytetrafluoroethylene (PTFE) and a mixture of styrene-butadiene rubber (SBR) and a water soluble polymer (carboxymethylcellulose (CMC), polyvinyl alcohol, sodium polyacrylate, dextrin, gluten, etc.).

Examples of the conductive auxiliary include carbon black, a carbon material, a micropowder of a metal such as copper, nickel, stainless steel and iron, a mixture of a carbon material and a metal micropowder and a conductive oxide such as ITO.

The positive electrode protecting layer 216 and the negative electrode protecting layer 226 are each a porous insulating layer. The positive electrode protecting layer 216 and the negative electrode protecting layer 226 each contains a silicone resin particle as a Si-containing organic particle, preferably contains a binder as mentioned above. The silicone resin particle is easily permeable with an electrolytic solution. The silicone resin particle has at least one of structural units represented by $RSiO_{1.5}$ and $R_2SiO$ (in the formula, R represents an alkyl group having 1 to 6 carbon atoms or a phenyl group) and a siloxane bond (Si—O—Si). Preferable examples of the alkyl group include a methyl group, an ethyl group, a propyl group, a butyl group, a pentyl group and a hexyl group. The silicone resin particle particularly preferably contains polymethylsilsesquioxane particle represented by the above formula, $RSiO_{1.5}$, where R is a methyl group. Note that, R in the structural unit may mutually differ between the structural units or two Rs of the above formula $R_2SiO$ may have mutually different functional groups.

The silicone resin particle has a melting point of preferably 150° C. or more, more preferably 200° C. or more and further preferably, 300° C. or more, for preventing short circuit during an overcharge test and suppressing generation of gas due to thermal decomposition.

The aspect ratio of the silicone resin particle, which is a ratio of the major-axis diameter to the minor-axis diameter, is preferably 1.00 to 1.50, more preferably 1.00 to 1.40 and further preferably 1.00 to 1.30. When the aspect ratio exceeds 1.50, permeability of an electrolytic solution decreases. As a result, rate characteristics tend to deteriorate. The aspect ratio is defined by a value obtained by dividing the major-axis diameter b of a silicone resin particle by the minor-axis diameter a, (b/a), and can be obtained by calculation as an average (b/a) value of arbitrarily chosen 10 silicone resin particles under an electron microscope.

The average particle size of the silicone resin particle is preferably 0.3 to 6.0 µm, more preferably 0.5 to 5.0 µm and further preferably, 1.0 to 4.0 µm. When the average particle size exceeds 6.0 µm, the thicknesses of the protecting layers 216, 226 exceed 6.0 µm. As a result, the ion migration distance within each of the protecting layers 216, 226 increases. Therefore, the resistance value of ion migration increases and rate characteristics tends to deteriorate. When the average particle size is less than 0.3 µm, to ensure a short circuit prevention function while maintaining the thicknesses of the protecting layers 216, 226 at a certain level, it is necessary to increase the number of layers of a particle to some extent. As a result, the interspace between particles tends to be narrow. The average particle size of the silicone resin particle can be defined by, for example, D50, which is 50%-diameter in a volume-based particle size distribution. The volume-based particle size distribution of the silicone resin particle can be easily measured by an apparatus (for example: Micro Track BRA (trade name) manufactured by Micro Track) for measuring particle-size distribution based on a laser diffraction-dispersion method.

The thicknesses of the positive electrode protecting layer 216 and the negative electrode protecting layer 226 are each preferably 0.3 to 6.0 µm, more preferably 0.5 to 5.0 µm, and further preferably, 1.0 to 4.0 µm. When the thickness exceeds 6.0 µm, an ion migration distance within the protecting layers 216, 226 increases. As a result, a resistance value of ion migration within the protecting layers 216, 226 increases and rate characteristics tend to deteriorate. When the thickness is less than 0.3 µm, the short circuit prevention function of the protecting layers 216, 226 tends to be rarely fulfilled. The positive electrode protecting layer 216 and the negative electrode protecting layer 226 are preferably arranged so as not to be overlapped with each other. This is because ions can easily migrate between the particles.

The separator 218 is sufficient if it is made of a porous material having electrical insulation properties. Example thereof include a single layer or a laminate of films formed of polyethylene, polypropylene or polyolefin and a stretched film of a mixture of these resins or nonwoven cloth of a fiber made of at least one component selected from the group consisting of cellulose, polyester and polypropylene.

The case 250 houses the laminate 230 and an electrolytic solution airtight. The case 250 is not particularly limited as long as it can suppress, e.g., leakage of an electrolytic solution outside and invasion of water or the like from the outside into the lithium ion secondary battery 200. For example, as the case 250, a metal laminate film formed by a metal foil 252 having coating of a polymer film 254 on both surfaces, as shown in FIG. 7, can be used. As the metal foil 252, for example, an aluminum foil can be used. As the polymer film 254, e.g., a polypropylene film can be used. As a material for the outer polymer film 254, a polymer having a high melting point is preferable and, for example, polyethylene terephthalate (PET) and polyamide are more preferable. As a material for the inner polymer film 254, e.g., polyethylene and polypropylene are preferable.

The leads 260, 262 are formed of a conductive material such as aluminum. Ends of the leads 260, 262 are connected to an end of the positive electrode collector 212 and an end of the negative electrode collector 222, respectively. The other ends of the leads 260, 262 extend outside the case 250.

Next, a method for manufacturing the lithium ion secondary battery 200 will be described.

First, the positive electrode 210 and the negative electrode 220 are prepared as follows. An active material particle, a binder and a necessary amount of conductive auxiliary are added to a solvent such as N-methyl-2-pyrrolidone or N,N-dimethylformamide to prepare a slurry. The slurry was applied to the surface of the collectors 212, 222 and dried to obtain the positive electrode active-material containing layer 214, and the negative electrode active-material containing layer 224. Next, a silicone resin and a binder are added to a solvent such as N-methyl-2-pyrrolidone or N,N-dimethylformamide to obtain a slurry. The slurry is applied to the surfaces of the positive electrode active-material containing layer 214 and the negative electrode active-material containing layer 224 and dried to obtain the protecting layers 216, 226. In this manner, the positive electrode 210 and the negative electrode 220 can be obtained.

Furthermore, other than the aforementioned positive electrode 210 and negative electrode 220, an electrolytic solution, a separator 218, case 250 and leads 260, 262 are prepared.

The electrolytic solution is allowed to contain within the positive electrode active-material containing layer 214, the positive electrode protecting layer 216, the separator 218, the negative electrode active-material containing layer 224 and the negative electrode protecting layer 226. The electrolytic solution is not particularly limited and, for example, an electrolytic solution (aqueous electrolytic solution, an electrolytic solution using an organic solvent) containing a lithium salt can be used. Note that if an aqueous electrolytic solution is electrochemically decomposed at a low voltage, a withstand voltage during electrical charge is low and limited. For this reason, an electrolytic solution (non-aqueous electrolytic solution) using an organic solvent is preferably used. As the electrolytic solution, an electrolytic solution dissolving a lithium salt in a non-aqueous solvent (an organic solvent) is preferably used. Examples of the lithium salt include salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$ and LiBOB. Note that, these salts may be used singly or in combination with two or more types in an arbitrary ratio.

Furthermore, as the organic solvent, for example, propylene carbonate, ethylene carbonate and diethyl carbonate, etc. are preferred. These may be used singly or in combination with two or more types in an arbitrary ratio.

Note that, the electrolytic solution may be not only a liquid-state electrolyte but also a gel-state electrolyte, which is obtained by adding a gelatinizing agent. Furthermore, a solid electrolyte (a solid polymer electrolyte or an electrolyte made of an ion conductive inorganic material) may be contained in place of an electrolytic solution.

Subsequently, according to a known method, the leads 260, 262 are welded to the positive electrode collector 212 and the negative electrode collector 222, respectively. A construct having the separator 218 sandwiched by the positive electrode protecting layer 216 of the positive electrode 210 and the negative electrode protecting layer 226 of the negative electrode 220 is inserted in the case 250 together with an electrolytic solution and the inlet of the case 250 is sealed. In this manner mentioned above, the lithium ion secondary battery 200 can be obtained.

In the embodiment, it is possible to suppress rate characteristics from deteriorating. In addition, it is possible to sufficiently suppress short circuit even at high temperatures. The reason is unknown; however, the present inventors consider as follows. In the embodiment, since the protecting layers 216, 226 contain a silicone resin particle as mentioned above, even if the thicknesses of the protecting layers 216, 226 are reduced to, for example, about 1 to 6 fold as small as the particle size of the silicone resin particle, the protecting layers 216, 226 can be obtained with relatively uniform thickness. Therefore, it is not necessary to sufficiently reduce the size of the particles constituting the protecting layers 216, 226 compared to the thickness of the protecting layers, in order to obtain the protecting layers 216, 226 having a uniform thickness. Therefore, as the particle constituting the protecting layers 216, 226, a particle having a relatively large size close to the thicknesses of the protecting layers 216, 226 can be used. By virtue of this, the interspace between particles is widened and ions in an electrolytic solution can easily migrate between the particles. Therefore, it is considered that rate characteristics is suppressed from deteriorating.

Furthermore, in the embodiment, the silicone resin particle has a siloxane bond. Therefore, even in a high temperature (for example, 400° C.), the protecting layers 216, 226 can be suppressed from melting. By virtue of this, the heat resistance of the protecting layers 216, 226 is improved and the short circuit prevention function of protecting layers 216, 226 can be maintained during a high-temperature operation time, such as an overcharge test. Furthermore, a process for manufacturing a lithium ion secondary battery, even if a separator is broken, short circuit between the positive electrode 210 and the negative electrode 220 can be suppressed by arranging the insulating protecting layers 216, 226.

The present invention is not limited to the embodiments above and can be variously modified. For example, a protecting layer may be provided only one of the positive electrode 210 and the negative electrode 220.

EXAMPLES

The present invention will be more specifically described based on Examples and Comparative Examples below; however, the present invention is not limited to the following Examples.

Example 1-1

Preparation of Negative Electrode

First, 1.5 parts by mass of sodium carboxymethylcellulose (trade name: Cellogen WS-C manufactured by Dai-ichi. Kogyo Seiyaku Co., Ltd.) was dissolved in pure water (purified through an ion exchange membrane and distillated). To the dissolution solution, 93.5 parts by mass of natural graphite (trade name: 140-702, manufactured by Hitachi Chemical Co., Ltd.), 2.0 parts by mass of acetylene black (trade name: Denka Black, manufactured by Denki Kagaku Kogyo K.K.) and 3.0 parts by mass of styrene-butadiene rubber (trade name: SN-307R manufactured by Nippon A&L Inc.) were added, mixed and dispersed by a planetary mixer to obtain a slurry-state coating solution for forming a negative electrode active-material layer. The coating solution was applied to both surfaces of a copper foil having a thickness of 15 μm by a doctor blade method, dried and pressed by a calender roll to form a negative electrode active-material layer having a thickness (one surface) of 80 μm.

Next, as an organic particle, 95.5 parts by mass of a poly (methyl methacrylate) particle having a crosslinked structure and having an average particle size (D50) of 2.0 μm and a ratio of major-axis length/minor-axis length of 1.03 (which was constituted of beads obtained by classification from crosslinked acrylic beads (trade name: Art Pearl series, manufactured by Negami Chemical Industrial Co., Ltd.), 3.0 parts by mass of styrene-butadiene rubber (trade name: SN-307R manufactured by Nippon A&L Inc.) and 1.5 parts by mass of sodium carboxymethylcellulose (trade name: Cellogen WS-C manufactured by Dai-ichi Kogyo Seiyaku Co., Ltd.) were mixed and dissolved in pure water (purified through an ion exchange membrane and distillated) to obtain a slurry-state coating solution for forming a protecting layer. The coating solution was applied to each negative electrode active-material layer by a doctor blade method and dried to obtain a protecting layer having a thickness of 2.0 μm (one surface). By virtue of this, a negative electrode having a negative electrode active-material layer and a protecting layer formed on both surfaces of a collector (two-surface coated negative electrode) was obtained.

Preparation of Positive Electrode

First, 44.5 parts by mass of lithium nickel-cobalt manganate (trade name: NCM-01ST-5, manufactured by Toda Kogyo Corp.), 44.5 parts by mass of lithium-manganese spinel (trade name: HPM-6050 manufactured by Toda Kogyo Corp.), 3.0 parts by mass of acetylene black (trade name: Denka Black, manufactured by Denki Kagaku Kogyo K.K.), 3.0 parts by mass of graphite (trade name: KS-6, manufactured by Timcal Ltd.) and 5.0 parts by mass of polyvinylidene fluoride (PVDF) (trade name: KYNAR-761, manufactured by Arkema Inc.) were mixed and dissolved in N-methylpyrrolidone (NMP) to obtain a slurry-state coating solution for forming a positive electrode active-material layer. The coating solution was applied to both surfaces of an aluminum foil having a thickness of 20 μm by a doctor blade method, dried and pressed by a calender roll to form a positive electrode active-material layer having a thickness (one surface) of 95 µm. In this manner, a positive electrode (two-surface coated positive electrode) having a positive electrode active-material layer formed on both surfaces of a collector was obtained.

Preparation of Electrolytic Solution

First, 20 parts by volume of propylene carbonate (PC), 10 parts by volume of ethylene carbonate (EC) and 70 parts by volume of diethyl carbonate were mixed to obtain a solvent mixture. In the solvent mixture, lithium hexafluorophosphate (LiPF$_6$) was dissolved so as to obtain a concentration of 1.5 mol·dm$^{-3}$ to obtain an electrolytic solution.

Preparation of Lithium Ion Secondary Battery

A two-surface coated negative electrode (dimension of 31.0 mm×41.5 mm) in a shape having a tongue portion was obtained by stamping. A two-surface coated positive electrode (dimension of 30.5 mm×41.0 mm) in a shape having a tongue portion was obtained by stamping. Furthermore, a separator formed of polyethylene and having a dimension of 32.0 mm×43.0 mm was prepared. Six sheets of two-surface coated negative electrodes and five sheets of two-surface coated positive electrodes were alternately laminated with the separator interposed between them to form a laminate having the laminate structure: two-surface coated negative electrode/separator/two-surface coated positive electrode/separator/two-surface coated negative electrode/separator/two-surface coated positive electrode/separator/two-surface coated negative electrode/separator/two-surface coated positive electrode/separator/two-surface coated negative electrode/separator/two-surface coated positive electrode/separator/two-surface coated negative electrode/separator/two-surface coated positive electrode/separator/two-surface coated negative electrode. The resultant laminate structure was housed in an aluminum laminate film and an electrolytic solution was injected and sealed under vacuum. In this manner, a lithium ion secondary battery was prepared which had the same structure as that shown in FIG. 5 and FIG. 6 except the number of two-surface coated negative electrodes and the number of two-surface coated positive electrodes laminated.

Example 1-2

A lithium ion secondary battery was prepared in the same manner as in Example 1-1 except that, as the organic particle of the protecting layer, use was made of a poly(methyl methacrylate) particle having a crosslinked structure and having an average particle size (D50) of 0.5 µm and a ratio of major-axis length/minor-axis length of 1.03 (which was constituted of beads obtained by classification from crosslinked acrylic beads (trade name: Art Pearl series), manufactured by Negami Chemical Industrial Co., Ltd).

Example 1-3

A lithium ion secondary battery was prepared in the same manner as in Example 1-1 except that, as the organic particle of the protecting layer, use was made of a poly(methyl methacrylate) particle having a crosslinked structure and having an average particle size (D50) of 4.0 µm and a ratio of major-axis length/minor-axis length of 1.03 (which was constituted of beads obtained by classification from crosslinked acrylic beads (trade name: Art Pearl series), manufactured by Negami Chemical Industrial Co., Ltd.) and further the thickness of the protecting layer was set to 4.0 µm.

Example 1-4

A lithium ion secondary battery was prepared in the same manner as in Example 1-1 except that, as the organic particle of the protecting layer, use was made of a poly(methyl methacrylate) particle having a crosslinked structure and having an average particle size (D50) of 2.0 µm and a ratio of major-axis length/minor-axis length of 1.30 (which was constituted of beads obtained by classification from crosslinked acrylic beads (trade name: Art Pearl series), manufactured by Negami Chemical Industrial Co., Ltd).

Example 1-5

A lithium ion secondary battery was prepared in the same manner as in Example 1-1 except that, as the organic particle of the protecting layer, use was made of a poly(methyl methacrylate) particle having a crosslinked structure and having an average particle size (D50) of 2.0 µm and a ratio of major-axis length/minor-axis length of 2.00 (which was constituted of beads obtained by classification from crosslinked acrylic beads (trade name: Art Pearl series), manufactured by Negami Chemical Industrial Co., Ltd).

Comparative Example 1-1

A lithium ion secondary battery was prepared in the same manner as in Example 1-1 except that, as the organic particle of the protecting layer, use was made of a non-crosslinked poly(methyl methacrylate) powder (an average particle size (D50): 2.0 µm, ratio of major-axis length/minor-axis length of 1.03).

Comparative Example 1-2

A lithium ion secondary battery was prepared in the same manner as in Example 1-1 except that, as the organic particle of the protecting layer, use was made of a polyethylene (PE) particle having an average particle size (D50) of 2.0 µm and a ratio of major-axis length/minor-axis length of 1.03 (which was constituted of beads obtained by classification from Flowsen (trade name) manufactured by Sumitomo Seika Chemicals Co., Ltd).

Comparative Example 1-3

A lithium ion secondary battery was prepared in the same manner as in Example 1-1 except that, as the organic particle of the protecting layer, use was made of a polytetrafluoroethylene (PTFE) particle having an average particle size (D50) of 2.0 µm and a ratio of major-axis length/minor-axis length of 1.03 (which was constituted of beads by classification from SST series (trade name) manufactured by SHAMROCK TECHNOLOGIES).

Comparative Example 1-4

A lithium ion secondary battery was prepared in the same manner as in Example 1-1 except that, as the organic particle of the protecting layer, use was made of an inorganic particle, more specifically, an alumina particle having an average particle size (D50) of 0.20 µm (which was constituted of beads obtained by classification from AKP (trade name) manufactured by Sumitomo Chemical Co., Ltd).

Comparative Example 1-5

A lithium ion secondary battery was prepared in the same manner as in Example 1-1 except that, as the organic particle of the protecting layer, use was made of an inorganic particle, more specifically, an alumina particle having an average particle size (D50) of 2.0 µm (which was constituted of beads obtained by classification from AL (trade name) manufactured by Sumitomo Chemical Co., Ltd). Note that the thickness of the protecting layer varied between 2.0 to 4.0 µm.

Comparative Example 1-6

A lithium ion secondary battery was prepared in the same manner as in Example 1-1 except that, as the organic particle of the protecting layer, use was made of a poly(methyl methacrylate) particle having a crosslinked structure and having an average particle size (D50) of 0.3 µm and a ratio of major-axis length/minor-axis length of 1.03 (which was constituted of beads obtained by classification from crosslinked acrylic beads (trade name: Art Pearl series), manufactured by Negami Chemical Industrial Co., Ltd).

Comparative Example 1-7

A lithium ion secondary battery was prepared in the same manner as in Example 1-1 except that, as the organic particle of the protecting layer, use was made of a poly(methyl methacrylate) particle having a crosslinked structure and having an average particle size (D50) of 6.0 µm and a ratio of major-axis length/minor-axis length of 1.03 (which was constituted of beads obtained by classification from crosslinked acrylic beads (trade name: Art Pearl series), manufactured by Negami Chemical Industrial Co., Ltd.) and further the thickness of the protecting layer was set to 6.0 µm.

<Measurement of Rate Characteristics>

With respect to the lithium ion secondary batteries obtained in Examples and Comparative Examples, discharged capacity was measured at 1 C (the amount of current discharged for one hour when constant-current discharge is performed at 25° C.) and at 5 C (the amount of current discharged for 0.2 hours when constant-current discharge is performed at 25° C.). The ratio (%) of discharged capacity obtained at 5 C to the discharged capacity (regarded as 100%) at 1 C was obtained as rate characteristics. The results are shown in Table 1.

<Charge-Discharge Cycle Test>

The lithium ion secondary batteries obtained in Examples and Comparative Examples were charged in a CCCV charge operation (4.2 V) at a rate of 1 C. Thereafter, constant-current discharge was performed to 2.5 V at a rate of 1 C. The charge-discharge operation was performed under an environment temperature of 45° C. The charge-discharge operation (regarded it as a single cycle) was repeated 500 times. The difference in thickness between the lithium ion secondary battery after 500 cycles and initial thickness thereof (thickness after 500 cycles—initial thickness) was obtained and regarded as swelling of the cell. The results are shown in Table 1. Note that the initial thickness of a lithium ion secondary battery varies depending upon the thickness of a protecting layer but is about 2.80 mm. The smaller the swelling of the cell, the more dendrite growth is suppressed, meaning that the cell is excellent in charge-discharge cycle characteristics and safety.

TABLE 1

| | Average size [µm] and material for organic particle | Ratio of major-axis length/minor-axis length of organic particle | Average size [µm] of inorganic particle (alumina) [µm] | Thickness of protecting layer [µm] | Rate characteristics 5C/1C [%] | Swelling of cell [mm] |
|---|---|---|---|---|---|---|
| Ex. 1-1 | 2.0 Crosslinked PMMA | 1.03 | — | 2.0 | 48 | No swelling of cell (less than 0.1) |
| Ex. 1-2 | 0.5 Crosslinked PMMA | 1.03 | — | 2.0 | 47 | No swelling of cell (less than 0.1) |
| Ex. 1-3 | 4.0 Crosslinked PMMA | 1.03 | — | 4.0 | 42 | No swelling of cell (less than 0.1) |
| Ex. 1-4 | 2.0 Crosslinked PMMA | 1.30 | — | 2.0 | 44 | No swelling of cell (less than 0.1) |
| Ex. 1-5 | 2.0 Crosslinked PMMA | 2.00 | — | 2.0 | 41 | No swelling of cell (less than 0.1) |
| Com. Ex. 1-1 | 2.0 Non-crosslinked PMMA | 1.03 | — | 2.0 | 44 | 0.5 |
| Com. Ex. 1-2 | 2.0 PE | 1.03 | — | 2.0 | 48 | 1.2 |
| Com. Ex. 1-3 | 2.0 PTFE | 1.03 | — | 2.0 | 46 | 1.1 |
| Com. Ex. 1-4 | — | — | 0.20 | 2.0 | 45 | 0.3 |
| Com. Ex. 1-5 | — | — | 2.0 | 2.0~4.0 | 39 | No swelling of cell (less than 0.1) |

TABLE 1-continued

|  | Average size [μm] and material for organic particle | Ratio of major-axis length/minor-axis length of organic particle | Average size [μm] of inorganic particle (alumina) [μm] | Thickness of protecting layer [μm] | Rate characteristics 5C/1C [%] | Swelling of cell [mm] |
|---|---|---|---|---|---|---|
| Com. Ex. 1-6 | 0.3 Crosslinked PMMA | 1.03 | — | 2.0 | 46 | 0.5 |
| Com. Ex. 1-7 | 6.0 Crosslinked PMMA | 1.03 | — | 6.0 | 28 | No swelling of cell (less than 0.1) |

Example 2-1

Preparation of Negative Electrode

First, 1.5 parts by mass of sodium carboxymethylcellulose (trade name: Cellogen WS-C, manufactured by Dai-ichi Kogyo Seiyaku Co., Ltd.) was dissolved in pure water (purified through an ion exchange membrane and distillated). To the dissolved, solution, 93.5 parts by mass of natural graphite (Trade name: HG-702, manufactured by Hitachi Chemical Co., Ltd.), 2.0 parts by mass of acetylene black (Trade name: Denka Black, manufactured by Denki Kagaku Kogyo K.K.) and 3.0 parts by mass of styrene-butadiene rubber (trade name: SN-307R, manufactured by Nippon A&L Inc.) were added, mixed and dispersed by a planetary mixer to obtain a slurry-state coating solution for forming a negative electrode active-material layer. The coating solution was applied to both surfaces of a copper foil having a thickness of 15 μm by a doctor blade method, dried and pressed by a calender roll to form a negative electrode active-material layer having a thickness (one surface) of 80 μm.

Next, 31.8 parts by mass of a polyethylene particle having an average particle size (D50) of 0.50 μm (which was constituted of beads obtained by classification from Flow beads HE series (trade name) manufactured by Sumitomo Seika Chemicals Co., Ltd.) as an organic particle, 63.7 parts by mass of an alumina particle (trade name: HIT series, manufactured by Sumitomo Chemical Co., Ltd., an average particle size (D50): 0.20 μm) as an inorganic particle, 3.0 parts by mass of styrene-butadiene rubber (trade name: SN-307R manufactured by Nippon A&L Inc.) and 1.5 parts by mass of sodium carboxymethylcellulose (trade name: Cellogen WS-C, manufactured by Dai-ichi Kogyo Seiyaku Co., Ltd.) were mixed and dissolved in pure water (purified through an ion exchange membrane and distillated) to obtain a slurry-state coating solution for forming a protecting layer. The coating solution was applied to each negative electrode active-material layer by a doctor blade method and dried to obtain a protecting layer having a thickness (one surface) of 2.0 μm. In this manner, a negative electrode (two-surface coated negative electrode) having a negative electrode active-material layer and a protecting layer formed on both surfaces of a collector was obtained.

Preparation of Positive Electrode

First, 44.5 parts by mass of lithium nickel-cobalt manganate (trade name: NCM-01ST-5, manufactured by Toda Kogyo Corp), 44.5 parts by mass of lithium-manganese spinel (trade name: HPM-6050 manufactured by Toda Kogyo Corp.), 3.0 parts by mass of acetylene black (trade name: Denka Black, manufactured by Denki Kagaku Kogyo K.K.), 3.0 parts by mass of graphite (trade name: KS-6, manufactured by Timcal Ltd.) and 5.0 parts by mass of polyvinyldene fluoride (PVDF) (trade name: KYNAR-761, manufactured by Arkema Inc.) were mixed and dissolved in N-methylpyrrolidone (MVP) to obtain a slurry-state coating solution for forming a positive electrode active-material layer. The coating solution was applied to both surfaces of an aluminum foil having a thickness of 20 μm by a doctor blade method, dried and pressed by a calender roll to form a positive electrode active-material layer having a thickness (one surface) of 95 μm. In this manner, a positive electrode (two-surface coated positive electrode) having a positive electrode active-material layer formed on both surfaces of a collector was obtained.

Preparation of Electrolytic Solution

First, 20 parts by volume of propylene carbonate (PC), 10 parts by volume of ethylene carbonate (EC) and 70 parts by volume of diethyl carbonate were mixed to obtain a solvent mixture. In the solvent mixture, lithium hexafluorophosphate (LiPF$_6$) was dissolved so as to obtain a concentration of 1.5 mol·dm$^{-3}$ to obtain an electrolytic solution.

Preparation of Lithium Ion Secondary Battery

A two-surface coated negative electrode (dimension of 31.0 mm×41.5 mm) in a shape having a tongue portion was obtained by stamping. A two-surface coated positive electrode (dimension of 30.5 mm×41.0 mm) in a shape having a tongue portion was obtained by stamping. Furthermore, a separator formed of polyethylene and having a dimension of 32.0 mm×43.0 mm was prepared. Six sheets of two-surface coated negative electrodes and five sheets of two-surface coated positive electrodes were alternately laminated with the separator interposed between them to form a laminate having the laminate structure: two-surface coated negative electrode/separator/two-surface coated positive electrode/separator/two-surface coated negative electrode/separator/two-surface coated positive electrode/separator/two-surface coated negative electrode/separator/two-surface coated positive electrode/separator/two-surface coated negative electrode/separator/two-surface coated positive electrode/separator/two-surface coated negative electrode/separator/two-surface coated positive electrode/separator/two-surface coated negative electrode. The resultant laminate structure was housed in an aluminum laminate film and an electrolytic solution was injected and sealed under vacuum. In this manner, a lithium ion secondary battery was prepared, which had the same structure as that shown in FIG. 5 and FIG. 6 except the number of two-surface coated negative electrodes and the number of two-surface coated positive electrodes laminated.

Example 2-2

A lithium ion secondary battery was prepared in the same manner as in Example 2-1 except that, as the organic particle of the protecting layer, use was made of a polypropylene particle having an average particle size (D50) of 0.5 μm obtained by classification of a polypropylene particle (trade name: [TRL-PP-101 series], manufactured by Trial Corporation).

Example 2-3

A lithium ion secondary battery was prepared in the same manner as in Example 2-1 except that, as the inorganic particle of the protecting layer, use was made of an alumina particle having an average particle size (D50):0.50 μm (trade name: AKP series manufactured by Sumitomo Chemical Co., Ltd).

Example 2-4

A lithium ion secondary battery was prepared in the same manner as in Example 2-1 except that, as the inorganic particle of the protecting layer, use was made of a silica particle having an average particle size (D50) of 0.2 μm and obtained by classification from SICASTAR (trade name), plain type, manufactured by Corefront Corporation).

Example 2-5

A lithium ion secondary battery was prepared in the same manner as in Example 2-1 except that the thickness of the protecting layer was set to 3.5 μm.

Example 2-6

A lithium ion secondary battery was prepared in the same manner as in Example 2-1 except that the thickness of the protecting layer was set to 4.0 μm.

Example 2-7

A lithium ion secondary battery was prepared in the same manner as in Example 2-1 except that the thickness of the protecting layer was set to 4.5 μm.

Example 2-8

A lithium ion secondary battery was prepared in the same manner as in Example 2-1 except that the thickness of the protecting layer was set to 6.0 μm.

Example 2-9

A lithium ion secondary battery was prepared in the same manner as in Example 2-1 except that the thickness of the protecting layer was set to 1.0 μm.

Example 2-10

A lithium ion secondary battery was prepared in the same manner as in Example 2-1 except that the thickness of the protecting layer was set to 0.5 μm.

Example 2-11

A lithium ion secondary battery was prepared in the same manner as in Example 2-1 except that the average particle size (D50) of the polyethylene particle classified was set to 0.10 μm and the thickness of the protecting layer was set to 0.25 μm.

Example 2-12

A lithium ion secondary battery was prepared in the same manner as in Example 2-1 except that, in the protecting layer, the content of the organic particle was set to 47.7 parts by mass, and the content of the inorganic particle was set to 47.8 parts by mass.

Example 2-13

A lithium ion secondary battery was prepared in the same manner as in Example 2-1 except that, in the protecting layer, the content of the organic particle was set to 41.5 parts by mass, and the content of the inorganic particle was set to 53.9 parts by mass.

Example 2-14

A lithium ion secondary battery was prepared in the same manner as in Example 2-1 except that, in the protecting layer, the content of the organic particle was set to 38.2 parts by mass, and the content of the inorganic particle was set to 57.3 parts by mass.

Example 2-15

A lithium ion secondary battery was prepared in the same manner as in Example 2-1 except that, in the protecting layer, the content of the organic particle was set to 23.9 parts by mass, and the content of the inorganic particle was set to 71.6 parts by mass.

Example 2-16

A lithium ion secondary battery was prepared in the same manner as in Example 2-1 except that, in the protecting layer, the content of the organic particle was set to 22.7 parts by mass, and the content of the inorganic particle was set to 72.8 parts by mass.

Example 2-17

A lithium ion secondary battery was prepared in the same manner as in Example 2-1 except that, in the protecting layer, the content of the organic particle was set to 19.1 parts by mass, and the content of the inorganic particle was set to 76.4 parts by mass.

Example 2-18

A lithium ion secondary battery was prepared in the same manner as in Example 2-1 except that the average particle size (D50) of the alumina particle classified was set to 1.00 μm.

Example 2-19

A lithium ion secondary battery was prepared in the same manner as in Example 2-1 except that the average particle size (D50) of the alumina particle classified was set to 0.16 μm.

Example 2-20

A lithium ion secondary battery was prepared in the same manner as in Example 2-1 except that the average particle size (D50) of the alumina particle classified was set to 0.13 μm.

Example 2-21

A lithium ion secondary battery was prepared in the same manner as in Example 2-1 except that, as the organic particle of the protecting layer, a polyethylene particle having an average particle size (D50) of 0.10 μm and, obtained by classification from Flow beads HE series (trade name, manufactured by Sumitomo Seika Chemicals Co., Ltd.) was used and, as the inorganic particle, an alumina particle (trade name: HIT series, an average particle size (D50): 0.10 μm, manufactured by Sumitomo Chemical Co., Ltd.) was used.

Example 2-22

A lithium ion secondary battery was prepared in the same manner as in Example 2-1 except that, as the organic particle of the protecting layer, a polyethylene particle having an average particle size (D50) of 4.0 μm obtained by classification from Flow beads HE series, (trade name manufactured by Sumitomo Seika Chemicals Co., Ltd.) was used and, as the inorganic particle, an alumina particle (trade name: AL series, an average particle size (D50): 4.0 μm, manufactured by Sumitomo Chemical. Co., Ltd.) was used.

Comparative Example 2-1

A lithium ion secondary battery was prepared in the same manner as in Example 2-1 except that the protecting layer was not provided.

Comparative Example 2-2

A lithium ion secondary battery was prepared in the same manner as in Example 2-1 except that, in the protecting layer, the organic particle was not used and the content of the inorganic particle was set to 95.5 parts by mass.

Comparative Example 2-3

A lithium ion secondary battery was prepared in the same manner as in Example 2-1 except that, in the protecting layer, the inorganic particle was not used and the content of the organic particle was set to 95.5 parts by mass.

Comparative Example 2-4

A lithium ion secondary battery was prepared in the same manner as in Example 2-1 except that, in the protecting layer, the content of the organic particle was set to 63.7 parts by mass and the content of the inorganic particle was set to 31.8 parts by mass.

Comparative Example 2-5

A lithium ion secondary battery was prepared in the same manner as in Example 2-1 except that, in the protecting layer, the content of the organic particle was set to 15.9 parts by mass and the content of the inorganic particle was set to 79.6 parts by mass.

Comparative Example 2-6

A lithium ion secondary battery was prepared in the same manner as in Example 2-1 except that, as the organic particle of the protecting layer, a polyethylene particle having an average particle size (D50) of 0.05 μm and obtained by classification from Flow beads HE series (trade name, manufactured by Sumitomo Seika Chemicals Co., Ltd.) was used and, as the inorganic particle, an alumina particle (trade name: HIT series, an average particle size (D50): 0.05 μm, manufactured by Sumitomo Chemical Co., Ltd.) was used.

Comparative Example 2-7

A lithium ion secondary battery was prepared in the same manner as in Example 2-1 except that, as the organic particle of the protecting layer, a polyethylene particle having an average particle size (D50): 6.0 μm and obtained by classification from Flow beads HE series, (trade name, manufactured by Sumitomo Seika Chemicals Co., Ltd.) was used, and as the inorganic particle, an alumina particle (trade name: AL series, an average particle size (D50): 6.0 μm, manufactured by Sumitomo Chemical Co., Ltd.) was used and the thickness of the protecting layer was set to 7.0 μm.

Comparative Example 2-8

A lithium ion secondary battery was prepared in the same manner as in Example 2-1 except that, as the organic particle of the protecting layer, a polytetrafluoroethylene (PTFE) particle having a an average particle size (D50) of 0.50 μm and obtained by classification from SST series (trade name, manufactured by SHAMROCK TECHNOLOGIES) was used.

<Measurement of Impedance>

The lithium ion secondary batteries obtained in Examples and Comparative Examples were measured for impedance (mΩ) at an alternate current of 1 kHz by an impedance analyzer (SI 1287, SI 1260) manufactured by Toyo Corporation. Note that, impedance was measured at an environment temperature of 25° C. and a relative humidity of 60%. The results are shown in Tables 2 to 4.

<Measurement of Rate Characteristics>

With respect to the lithium ion secondary batteries obtained in Examples and Comparative Examples, discharged capacity was measured at 1 C (the amount of current discharged for one hour when constant-current discharge is performed at 25° C.) and at 5 C (the amount of current discharged for 0.2 hours when constant-current discharge is performed at 25° C.) and the ratio (%) of discharged capacity obtained at 5 C to the discharged capacity (regarded as 100%) at 1 C was obtained as rate characteristics. The results are shown in Tables 2 to 4.

<Overcharge Test>

The lithium ion secondary batteries obtained in Examples and Comparative Examples were previously subjected to a charge-discharge process performed at a rate as low as 0.05 C at 25° C. and then subjected to a CC charge operation performed at 3 C until 10 V, and thereafter, CV charge was maintained until the temperature of the cell decreased. The maximum surface temperature of the cell surface was obtained based on temperature measurement and a change in shape of cells was observed. The results of them were used as the evaluation results of the overcharge test. The results are shown in Tables 2 to 4. Note that, in the overcharge test, the lithium ion secondary batteries that caused no cell burst can be evaluated that the protecting layer has a sufficient shutdown function and safety during a heat-up time is excellent. Furthermore, in the batteries that caused no burst, the lower the cell temperature, the more an increase of inner temperature of the cell was suppressed, meaning that the battery is high in safety. The cell temperature is preferably 80° C. or less.

<Temperature Raising Test>

The lithium ion secondary batteries obtained in Examples and Comparative Examples were previously subjected to a charge-discharge process performed at a rate as low as 0.05 C at 25° C. and then, subjected to a charge operation performed at 1 C until 4.2 V. Thereafter, the thickness of the cell (before storage) was measured. After that, the lithium ion secondary battery was loaded in an oven and the temperature was increased at a temperature raising rate of 5° C./minute until the temperature reached 150° C. and stored at 150° C. for one hour. Thereafter, the state of the cell was observed. The cell that did not burst was measured for thickness (after storage). The difference in thickness before and after storage was obtained as a degree of swelling (mm). The results are shown in Tables 2 to 4. Note that, the lithium ion secondary batteries that did not burst in the temperature raising test can be evaluated that shrinkage of the protecting layer is sufficiently suppressed and safety during a heat-up time is excellent.

TABLE 2

| | Average size [μm] and material for organic particle | Average size [μm] and material for inorganic particle | Content ratio (organic particle: inorganic particle) | Thickness of protecting layer [μm] | Impedance [mΩ] | Rate characteristics 5C/1C [%] | Overcharge test 3C-10 V (state of cell & cell temperature) | Temperature raising test 25~150° C. (state of cell & cell swelling) |
|---|---|---|---|---|---|---|---|---|
| Ex. 2-1 | 0.50 PE | 0.20 Alumina | 1:2 | 2.0 | 74 | 48 | No burst (68° C.) | No burst (degree of swelling: 0.5 mm or less) |
| Ex. 2-2 | 0.50 PE | 0.20 Alumina | 1:2 | 2.0 | 74 | 47 | No burst (68° C.) | No burst (degree of swelling: 0.5 mm or less) |
| Ex. 2-3 | 0.50 PE | 0.20 Alumina | 1:2 | 2.0 | 77 | 47 | No burst (65° C.) | No burst (degree of swelling: 0.5 mm or less) |
| Ex. 2-4 | 0.50 PE | 0.20 Alumina | 1:2 | 2.0 | 76 | 47 | No burst (66° C.) | No burst (degree of swelling: 0.5 mm or less) |
| Ex. 2-5 | 0.50 PE | 0.20 Alumina | 1:2 | 3.5 | 78 | 45 | No burst (64° C.) | No burst (degree of swelling: 0.5 mm or less) |
| Ex. 2-6 | 0.50 PE | 0.20 Alumina | 1:2 | 4.0 | 81 | 44 | No burst (63° C.) | No burst (degree of swelling: 0.5 mm or less) |
| Ex. 2-7 | 0.50 PE | 0.20 Alumina | 1:2 | 4.5 | 85 | 42 | No burst (61° C.) | No burst (degree of swelling: 0.5 mm or less) |
| Ex. 2-8 | 0.50 PE | 0.20 Alumina | 1:2 | 6.0 | 88 | 40 | No burst (61° C.) | No burst (degree of swelling: 0.5 mm or less) |
| Ex. 2-9 | 0.50 PE | 0.20 Alumina | 1:2 | 1.0 | 72 | 46 | No burst (73° C.) | No burst (degree of swelling: 0.5 mm or less) |
| Ex. 2-10 | 0.50 PE | 0.20 Alumina | 1:2 | 0.5 | 70 | 50 | No burst (77° C.) | No burst (degree of swelling: 0.5 mm or less) |
| Ex. 2-11 | 0.10 PE | 0.20 Alumina | 1:2 | 0.25 | 67 | 53 | No burst (80° C.) | No burst (degree of swelling: 0.5 mm or less) |

TABLE 3

| | Average size [μm] and material for organic particle | Average size [μm] and material for inorganic particle | Content ratio (organic particle: inorganic particle) | Thickness of protecting layer [μm] | Impedance [mΩ] | Rate characteristics 5C/1C [%] | Overcharge test 3C-10 V (state of cell & cell temperature) | Temperature raising test 25~150° C. (state of cell & cell swelling) |
|---|---|---|---|---|---|---|---|---|
| Ex. 2-12 | 0.50 PE | 0.20 Alumina | 1:1 | 2.0 | 74 | 49 | No burst (65° C.) | No burst (Degree of swelling: 1.6 mm) |
| Ex. 2-13 | 0.50 PE | 0.20 Alumina | 1:1.3 | 2.0 | 74 | 48 | No burst (65° C.) | No burst (Degree of swelling: 1.1 mm) |
| Ex. 2-14 | 0.50 PE | 0.20 Alumina | 1:1.5 | 2.0 | 74 | 47 | No burst (65° C.) | No burst (Degree of swelling: 0.8 mm) |
| Ex. 2-15 | 0.50 PE | 0.20 Alumina | 1:3 | 2.0 | 74 | 47 | No burst (71° C.) | No burst (Degree of swelling: 0.5 mm or less) |

TABLE 3-continued

|  | Average size [μm] and material for organic particle | Average size [μm] and material for inorganic particle | Content ratio (organic particle: inorganic particle) | Thickness of protecting layer [μm] | Impedance [mΩ] | Rate characteristics 5C/1C [%] | Overcharge test 3C-10 V (state of cell & cell temperature) | Temperature raising test 25~150° C. (state of cell & cell swelling) |
|---|---|---|---|---|---|---|---|---|
| Ex. 2-16 | 0.50 PE | 0.20 Alumina | 1:3:2 | 2.0 | 74 | 47 | No burst (78° C.) | No burst (Degree of swelling: 0.5 mm or less) |
| Ex. 2-17 | 0.50 PE | 0.20 Alumina | 1:4 | 2.0 | 75 | 45 | No burst (79° C.) | No burst (Degree of swelling: 0.5 mm or less) |
| Ex. 2-18 | 0.50 PE | 1.00 Alumina | 1:2 | 2.0 | 89 | 47 | No burst (68° C.) | No burst (Degree of swelling: 0.5 mm or less) |
| Ex. 2-19 | 0.50 PE | 0.16 Alumina | 1:2 | 2.0 | 70 | 46 | No burst (75° C.) | No burst (Degree of swelling: 0.5 mm or less) |
| Ex. 2-20 | 0.50 PE | 0.13 Alumina | 1:2 | 2.0 | 67 | 46 | No burst (79° C.) | No burst (Degree of swelling: 0.5 mm or less) |
| Ex. 2-21 | 0.10 PE | 0.10 Alumina | 1:2 | 2.0 | 76 | 44 | No burst (69° C.) | No burst (Degree of swelling: 0.5 mm or less) |
| Ex. 2-22 | 4.0 PE | 4.0 Alumina | 1:2 | 4.0 | 82 | 43 | No burst (63° C.) | No burst (Degree of swelling: 0.5 mm or less) |

TABLE 4

|  | Average size [μm] and material for organic particle | Average size [μm] and material for inorganic particle | Content ratio (organic particle: inorganic particle) | Thickness of protecting layer [μm] | Impedance [mΩ] | Rate characteristics 5C/1C [%] | Overcharge test 3C-10 V (state of cell & cell temperature) | Temperature raising test 25~150° C. (state of cell & cell swelling) |
|---|---|---|---|---|---|---|---|---|
| Com. Ex. 2-1 | — | — | — | — | 70 | 51 | Firing | Smoke generation |
| Com. Ex. 2-2 | — | 0.20 Alumina | — | 2.0 | 76 | 45 | Burst | No burst (Degree of swelling: 0.7 mm) |
| Com. Ex. 2-3 | 0.50 PE | — | — | 2.0 | 75 | 47 | No burst (63° C.) | Smoke generation |
| Com. Ex. 2-4 | 0.50 PE | 0.20 Alumina | 2:1 | 2.0 | 74 | 49 | No burst (59° C.) | Burst |
| Com. Ex. 2-5 | 0.50 PE | 0.20 Alumina | 1:5 | 2.0 | 75 | 46 | Burst | No burst (Degree of swelling: 0.8 mm) |
| Com. Ex. 2-6 | 0.05 PE | 0.05 Alumina | 1:2 | 2.0 | 92 | 38 | No burst (72° C.) | No burst (Degree of swelling: 0.8 mm) |
| Com. Ex. 2-7 | 6.0 PE | 6.0 Alumina | 1:2 | 7.0 | 116 | 20 | No burst (58° C.) | No burst (Degree of swelling: 0.8 mm) |
| Com. Ex. 2-8 | 0.50 PTFE | 0.2 Alumina | 1:2 | 2.0 | 75 | 46 | Burst | No burst (Degree of swelling: 0.8 mm) |

Example 3-1

Preparation of Negative Electrode

First, 1.5 parts by mass of sodium carboxymethylcellulose (trade name: Cellogen WS-C manufactured by Dai-ichi Kogyo Seiyaku Co., Ltd.) was dissolved in pure water (purified through an ion exchange membrane and distilled). To the dissolution solution, 93.5 parts by mass of natural graphite (trade name: HG-702, manufactured by Hitachi Chemical Co., Ltd.), 2.0 parts by mass of acetylene black (trade name: Denka Black, manufactured by Denki Kagaku Kogyo K.K.) and 3.0 parts by mass of styrene-butadiene rubber (trade name: SN-307R, manufactured by Nippon A&L Inc.) were added and mixed and dispersed by a planetary mixer to obtain a slurry-state coating solution for forming a negative electrode active-material layer. The coating solution was applied to both surfaces of a copper foil having a thickness of 15 μm by a doctor blade method, dried and pressed by a calender roll to form a negative electrode active-material layer having a thickness (one surface) of 80 μm.

Next, as a low-melting point organic particle, 31.8 parts by mass of a polyethylene particle having a melting temperature of 130° C. and an average particle size (D50) of 2.0 μm and obtained by classification from Flow beads HE series (trade name, manufactured by Sumitomo Seika Chemicals Co., Ltd.); as a high-melting point organic particle, 63.7 parts by mass of a polytetrafluoroethylene particle (trade name: SST series, melting temperature: 327° C., an average particle size (D50): 2.0 µm, manufactured by SHAMROCK TECHNOLOGIES), 3.0 parts by mass of styrene-butadiene rubber (trade name: SN-307R manufactured by Nippon A&L Inc.) and 1.5 parts by mass of sodium carboxymethylcellulose (trade name: Cellogen WS-C manufactured by Dai-ichi Kogyo Seiyaku Co., Ltd.) were mixed and dissolved in pure water (purified through an ion exchange membrane and distillated) to obtain a slurry-state coating solution for forming a protecting layer. The coating solution was applied to each negative electrode active-material layer by a doctor blade method and dried to obtain a protecting layer having a thickness (one surface) of 3.0 µm. In this manner, a negative electrode (two-surface coated negative electrode) having a negative electrode active-material layer and a protecting layer formed on both surfaces of a collector was obtained.

Preparation of Positive Electrode

First, 44.5 parts by mass of lithium nickel-cobalt manganate (trade name: NCM-01ST-5, manufactured by Toda Kogyo Corp.), 44.5 parts by mass of lithium-manganese spinel (trade name: HPM-6050 manufactured by Toda Kogyo Corp.), 3.0 parts by mass of acetylene black (trade name: Denka Black, manufactured by Denki Kagaku Kogyo K.K.), 3.0 parts by mass of graphite (trade name: KS-6, manufactured by Timcal Ltd.) and 5.0 parts by mass of polyvinyldene fluoride (PVDF) (trade name: KYNAR-761, manufactured by Arkema Inc.) were mixed and dissolved in N-methylpyrrolidone (NMP) to obtain a slurry-state coating solution for forming a positive electrode active-material layer. The coating solution was applied to both surfaces of an aluminum foil having a thickness of 20 µm by a doctor blade method, dried and pressed by a calender roll to form a positive electrode active-material layer having a thickness (one surface) of 95 µm. In this manner, a positive electrode (two-surface coated positive electrode) having a positive electrode active-material layer formed on both surfaces of a collector was obtained.

Preparation of Electrolytic Solution

First, 20 parts by volume of propylene carbonate (PC), 10 parts by volume of ethylene carbonate (EC) and 70 parts by volume of diethyl carbonate were mixed to obtain a solvent mixture. In the solvent mixture, lithium hexafluorophosphate ($LiPF_6$) was dissolved so as to obtain a concentration of 1.5 $mol·dm^{-3}$ to obtain an electrolytic solution.

Preparation of Lithium Ion Secondary Battery

A two-surface coated negative electrode (dimension of 31.0 mm×41.5 mm) in a shape having a tongue portion was obtained by stamping. A two-surface coated positive electrode (dimension of 30.5 mm×41.0 mm) in a shape having a tongue portion was obtained by stamping. Furthermore, a separator formed of polyethylene and having a dimension of 32.0 mm×43.0 mm was prepared. Six sheets of two-surface coated negative electrodes and five sheets of two-surface coated positive electrodes were alternately laminated with the separator interposed between them to form a laminate having the laminate structure: two-surface coated negative electrode/separator/two-surface coated positive electrode/separator/two-surface coated negative electrode/separator/two-surface coated positive electrode/separator/two-surface coated negative electrode/separator/two-surface coated positive electrode/separator/two-surface coated negative electrode/separator/two-surface coated positive electrode/separator/two-surface coated negative electrode/separator/two-surface coated positive electrode/separator/two-surface coated negative electrode. The resultant laminate structure was housed in an aluminum laminate film and an electrolytic solution was injected and sealed under vacuum. In this manner, a lithium ion secondary battery was prepared, which had the same structure as that shown in FIG. 5 and FIG. 6 except the number of two-surface coated negative electrodes and the number of two-surface coated positive electrodes laminated.

Example 3-2

A lithium ion secondary battery was prepared in the same manner as in Example 3-1 except that, as the low-melting point organic particle of the protecting layer, use was made of a polyethylene particle having a inciting temperature of 105° C. and an average particle size (D50) of 2.0 µm and obtained by classification from Flow beads LE series, (trade name, manufactured by Sumitomo Seika Chemicals Co., Ltd).

Example 3-3

A lithium ion secondary battery was prepared in the same manner as in Example 3-1 except that, as the low-melting point organic particle of the protecting layer, use was made of a polypropylene particle having a melting temperature of 170° C., an average particle size (D50) of 2.0 µm and obtained by classification from polypropylene particle [TRL-PP-101 series] (trade name, manufactured by Trial Corporation).

Example 3-4

A lithium ion secondary battery was prepared in the same manner as in Example 3-1 except that, as the high-melting point organic particle of the protecting layer, use was made of a poly(methyl methacrylate) particle having a melting temperature of 195° C. and an average particle size (D50) of 2.0 µm and obtained by classification from High pearl series (acrylic beads) (trade name, manufactured by Negami Chemical Industrial Co., Ltd).

Example 3-5

A lithium ion secondary battery was prepared in the same manner as in Example 3-1 except that, as the high-melting point organic particle of the protecting layer, use was made of a polyimide particle (synthesized by an isocyanate method, melting temperature: 300° C. or more (not softened at a temperature less than 300° C.), an average particle size (D50): 2.0 µm).

Note that, the polyimide particle was prepared by an isocyanate method as follows. First, 0.1 mole of 3,3',4,4'-benzophenone tetracarboxylic acid dianhydride (BTDA) was dissolved in 224 g of N-methyl-2-pyrrolidone (NMP) to prepare a solution. While heating and stirring at 140° C., 0.05 mole of triethylenediamine (TEDA) serving as a catalyst was added to the solution and dispersed well. Subsequently, 0.1 mole of 2,4-tolylenediisocyanate (TDI) was added, mixed and stirred for 24 hours to precipitate a microparticle of a polyimide precursor. Thereafter, the polyimide-precursor microparticle was recovered by a centrifugal machine and washed with acetone. The centrifugation and washing were repeatedly performed to purify the polyimide-precursor microparticle. Thereafter, the microparticle was dispersed in N-methyl-2-pyrrolidone (NMP) and refluxed at 190° C. for 5 hours and a polymerization reaction was continued. After completion of the reaction, the reaction was cooled and filtrated to obtain polyimide, which, was washed with acetone, dried to obtain a polyimide particle. The resultant polyimide particle was classified to obtain a particle having an average particle size (D50) of 2.0 μm. This was used as the high-melting point organic particle of the example.

Example 3-6

A lithium ion secondary battery was prepared in the same manner as in Example 3-1 except that, in the protecting layer, the content of the low-melting point organic particle was set to 47.7 parts by mass and the content of the high-melting point organic particle was set to 47.8 parts by mass.

Example 3-7

A lithium, ion secondary battery was prepared in the same manner as in Example 3-1 except that, in the protecting layer, the content of the low-melting point organic particle was set to 53.0 parts by mass and the content of the high-melting point organic particle was set to 42.5 parts by mass.

Example 3-8

A lithium ion secondary battery was prepared in the same manner as in Example 3-1 except that, in the protecting layer, the content of the low-melting point organic particle was set to 19.1 parts by mass and the content of the high-melting point organic particle was set to 76.4 parts by mass.

Example 3-9

A lithium ion secondary battery was prepared in the same manner as in Example 3-1 except that, in the protecting layer, the content of the low-melting point organic particle was set to 17.4 parts by mass and the content of the high-melting point organic particle was set to 78.1 parts by mass.

Comparative Example 3-1

A lithium ion secondary battery was prepared in the same manner as in Example 3-1 except that, in the protecting layer, as the low-melting point organic particle, use was made of an ethylene-vinyl acetate copolymer (EVA) particle having a melting temperature of 80° C., an average particle size (D50) of 2.0 μm (an ethylene-vinyl acetate copolymer particle extracted from Aquatech EC-1700 (trade name) solution and classified, manufactured by CHIRIKA. Co., Ltd).

Comparative Example 3-2

A lithium ion secondary battery was prepared in the same manner as in Example 3-1 except that, in the protecting layer, as the low-melting point organic particle, use was made of a benzoguanamine (BG) particle having a melting temperature of 228° C. and an average particle size (D50) of 2.0 μm, and obtained by classification from EPOSTAR (trade name, registered trade mark), MS grade, manufactured by NIPPON SHOKUBAI CO., LTD).

Comparative Example 3-3

A lithium ion secondary battery was prepared in the same manner as in Example 3-1 except that, in the protecting layer, as the high-melting point organic particle, use was made of a polyphenylene sulfide (PPS) particle having a melting temperature of 282° C. and an average particle size (D50) of 2.0 μm (trade name: FORTRON, 0220A9 grade]), which was pulverized and classified to put in use, manufactured by Polyplastics Co., Ltd).

Comparative Example 3-4

A lithium ion secondary battery was prepared in the same manner as in Example 3-1 except that, in the protecting layer, the content of the low-melting point organic particle was set to 95.5 parts by mass, and the high-melting point organic particle was not added.

Comparative Example 3-5

A lithium ion secondary battery was prepared in the same manner as in Example 3-1 except that, in the protecting layer, the low-melting point organic particle was not added, and the content of the high-melting point organic particle was 95.5 parts by mass.

Comparative Example 3-6

A lithium ion secondary battery was prepared in the same manner as in Example 3-1 except that, in the protecting layer, the low-melting point ORGANIC particle and the high-melting point organic particle were not added, and 95.5 parts by mass of an alumina particle (trade name: AL series, an average particle size (D50): 2.0 μm manufactured by Sumitomo Chemical Co., Ltd.) was added as the inorganic particle.

Comparative Example 3-7

A lithium ion secondary battery was prepared in the same manner as in Example 3-1 except that, in the protecting layer, the low-melting point organic particle was not added; 31.8 parts by mass of an alumina particle (trade name: AL series, an average particle size (D50): 2.0 μm, manufactured by Sumitomo Chemical Co., Ltd.) was added as the inorganic particle; and the content of the high-melting point organic particle was set to 63.7 parts by mass.

Comparative Example 3-8

A lithium ion secondary battery was prepared in the same manner as in Example 3-1 except that the protecting layer was not provided.

<Measurement of Rate Characteristics>

With, respect to the lithium ion secondary batteries obtained in Examples and Comparative Examples, discharged capacity was measured at 1 C (the amount of current discharged for one hour when constant-current discharge is performed at 25° C.) and at 5 C (the amount of current discharged for 0.2 hours when constant-current discharge is performed at 25° C.). The ratio (%) of discharged capacity obtained at 5 C to the discharged capacity (regarded as 100%) at 1 C was obtained as rate characteristics. The results are shown in Tables 5 and 6.

<Measurement of Impedance Increase Rate>

The lithium ion secondary batteries obtained in Examples and Comparative Examples were each measured for impedance (mΩ) at an alternate current of 1 kHz by an impedance analyzer (SI 1287, SI 1260) manufactured by Toyo Corporation. This was regarded as an initial impedance. Next, the lithium ion secondary battery was previously subjected to a charge-discharge operation performed at a rate as low as 0.05 C at 25° C. and a CC charge operation and a CV charge operation were performed under an environment temperature of 50° C. at 1 C until 4.2 V, and thereafter, discharged at 1 C up to 3.0 V. The charge-discharge operation (regarded it as a single cycle) was repeated up to 100 times. Thereafter, the lithium ion secondary battery was measured for impedance (mΩ) at an alternate current of 1 kHz by an impedance analyzer (SI 1287, SI 1260) manufactured by Toyo Corporation, which valve was used as the impedance after the cycle test. Note that impedance was measured at an environment temperature of 25° C. and a relative humidity of 60%. An impedance increase rate was obtained in accordance with the following expression (A), wherein the initial impedance was represented by R1 and the impedance after the cycle test was represented by R2. The results are shown in Tables 5 and 6.

Impedance increase rate (%)={(R2−R1)/R1}×100    (A)

<Overcharge Test>

The lithium ion secondary batteries obtained in Examples and Comparative Examples were each previously subjected to a charge-discharge operation at a rate as low as 0.05 C at 25° C. and then subjected to a CC charge operation performed at 3 C until 10 V, and thereafter, CV charge was maintained until the temperature of the cell decreased. The maximum surface temperature of the cell surface was obtained based on temperature measurement and states of cells were observed. These measurement results are shown in Tables 5 and 6. Note that, in the overcharge test, the lithium ion secondary batteries that caused no cell burst can be evaluated that the protecting layer has a sufficient shutdown function and safety during a heat-up time is excellent. Furthermore, in the batteries that caused no burst, the lower the cell temperature, the more an increase of inner temperature of the cell was suppressed, meaning that the battery is high in safety. The cell temperature is preferably 80° C. or less <Temperature Raising Test>

The lithium ion secondary batteries obtained in Examples and Comparative Examples were each previously subjected to a charge-discharge process performed at a rate as low as 0.05 C at 25° C. and then, subjected to a charge operation performed at 1 C until 4.2 V. Thereafter, the thickness of the cell (before storage) was measured. After that, the lithium ion secondary battery was loaded in an oven and the temperature was increased at a temperature raising rate of 5° C./minute until the temperature reached 150° C. and stored at 150° C. for one hour. Thereafter, the state of the cell was observed. The cell that did not burst was measured for thickness (after storage). The difference in thickness before and after storage was obtained as a degree of swelling (mm). The results are shown in Tables 5 and 6. Note that, lithium ion secondary batteries that did not burst in the temperature raising test can be evaluated that shrinkage of the protecting layer during a heat-up time is sufficiently suppressed and safety during a heat-up time is excellent.

TABLE 5

| | Material and melting point of low-melting point organic particle | Material and melting point of high-melting point organic particle | Material for inorganic particle | Content ratio (low-melting point: high-melting point) | Rate characteristics 5C/1C [%] | Impedance increase rate [%] | Overcharge test 3C-10 V (state of cell & cell temperature) | Temperature raising test 25~150° C. (state of cell & cell swelling) |
|---|---|---|---|---|---|---|---|---|
| Ex. 3-1 | PE (130° C.) | PTFE (327° C.) | — | 1:2 | 48 | 10 | No burst (69° C.) | No burst (Degree of swelling: less than 0.5 mm) |
| Ex. 3-2 | PE (105° C.) | PTFE (327° C.) | — | 1:2 | 48 | 18 | No burst (69° C.) | No burst (Degree of swelling: less than 0.5 mm) |
| Ex. 3-3 | PP (170° C.) | PTFE (327° C.) | — | 1:2 | 47 | 9 | No burst (72° C.) | No burst (Degree of swelling: less than 0.5 mm) |
| Ex. 3-4 | PMMA (195° C.) | PTFE (327° C.) | — | 1:2 | 47 | 9 | No burst (75° C.) | No burst (Degree of swelling: less than 0.5 mm) |
| Ex. 3-5 | PE (130° C.) | PI (≥300° C.) | — | 1:2 | 48 | 10 | No burst (68° C.) | No burst (Degree of swelling: less than 0.5 mm) |
| Ex. 3-6 | PE (130° C.) | PTFE (327° C.) | — | 1:1 | 48 | 12 | No burst (67° C.) | No burst (Degree of swelling: 0.85 mm) |
| Ex. 3-7 | PE (130° C.) | PTFE (327° C.) | — | 1:0.8 | 48 | 13 | No burst (70° C.) | No burst (Degree of swelling: 1.7 mm) |
| Ex. 3-8 | PE (130° C.) | PTFE (327° C.) | — | 1:4 | 48 | 10 | No burst (76° C.) | No burst (Degree of swelling: 0.65 mm) |
| Ex. 3-9 | PE (130° C.) | PTFE (327° C.) | — | 1:4.5 | 48 | 9 | No burst (83° C.) | No burst (Degree of swelling: 0.8 mm) |

TABLE 6

| | Material and melting point of low-melting point organic particle | Material and melting point of high-melting point organic particle | Material for inorganic particle | Content ratio (low-melting point: high-melting point) | Rate characteristics 5C/1C [%] | Impedance increase rate [%] | Overcharge test 3C-10 V (state of cell & cell temperature) | Temperature raising test 25~150° C. (state of cell & cell swelling) |
|---|---|---|---|---|---|---|---|---|
| Com. Ex. 3-1 | EVA (80° C.) | PTFE (327° C.) | — | 1:2 | 47 | 76 | No burst (68° C.) | No burst (Degree of swelling: 0.8 mm) |
| Com. Ex. 3-2 | BG (228° C.) | PTFE (327° C.) | — | 1:2 | 48 | 11 | Burst | No burst (Degree of swelling: 0.9 mm) |
| Com. Ex. 3-3 | PE (130° C.) | PPS (282° C.) | — | 1:2 | 48 | 10 | No burst (71° C.) | Burst |
| Com. Ex. 3-4 | PE (130° C.) | — | — | — | 47 | 11 | No burst (72° C.) | Smoke generation |
| Com. Ex. 3-5 | — | PTFE (327° C.) | — | — | 49 | 12 | Burst | No burst (Degree of swelling: 0.9 mm) |
| Com. Ex. 3-6 | — | — | Alumina | — | 39 | 11 | Burst | No burst (Degree of swelling: 1.2 mm) |
| Com. Ex. 3-7 | — | PTFE (327° C.) | Alumina | 1:2 | 46 | 11 | Burst | No burst (Degree of swelling: 1.0 mm) |
| Com. Ex. 3-8 | — | — | — | — | 51 | 10 | Firing | Smoke generation |

Example 4-1

First, 90.0 parts by mass of a natural graphite particle (trade name "HG-706" manufactured by Hitachi Chemical Co., Ltd.), 2 parts by mass of acetylene black serving as a conductive auxiliary and 8 parts by mass of PVDF serving as a binder were mixed and dispersed by a planetary mixer. After the viscosity was controlled with N-methyl-2-pyrrolidone, the solution was mixed and dispersed by Gaulin homogenizer to prepare a slurry. The slurry was applied onto one of the surfaces of a copper foil serving as a negative electrode collector and having a thickness of 15 μm and dried. Similarly, the slurry was applied onto the other surface of the copper foil, dried and pressed by a roll to form a negative electrode active-material layer having a thickness of 85 μm on both surfaces of the copper foil.

Thereafter, 92.0 parts by mass of a silicone resin particle (trade name: "TOSPEARL" manufactured by MOMENTIVE PERFORMANCE MATERIALS, an average particle size (D50): 2.0 μm, aspect ratio: 1.03) and PVDF (8 parts by mass) serving as a binder were mixed and dispersed by a planetary mixer. After the viscosity was controlled with N-methyl-2-pyrrolidone to prepare a slurry. The slurry was applied onto the negative electrode active-material layer formed on each of the surfaces of a copper foil and dried to form a negative electrode protecting layer having a thickness of 2.0 μm. In this manner, a negative electrode (two-surface coated negative electrode) having a negative electrode active-material layer and a negative electrode protecting layer formed on both surfaces of a collector was obtained. Note that, an average particle size (D50) was calculated based on the measurement data obtained by a Microtrack HRA (trade name, manufactured by Microtrack Co., Ltd.). The aspect ratio was obtained by calculation as an average of major-axis length/minor-axis length values of arbitrarily chosen 10 silicone resin particles under an electron microscope.

Examples 4-2 to 4-7

Figure 7:
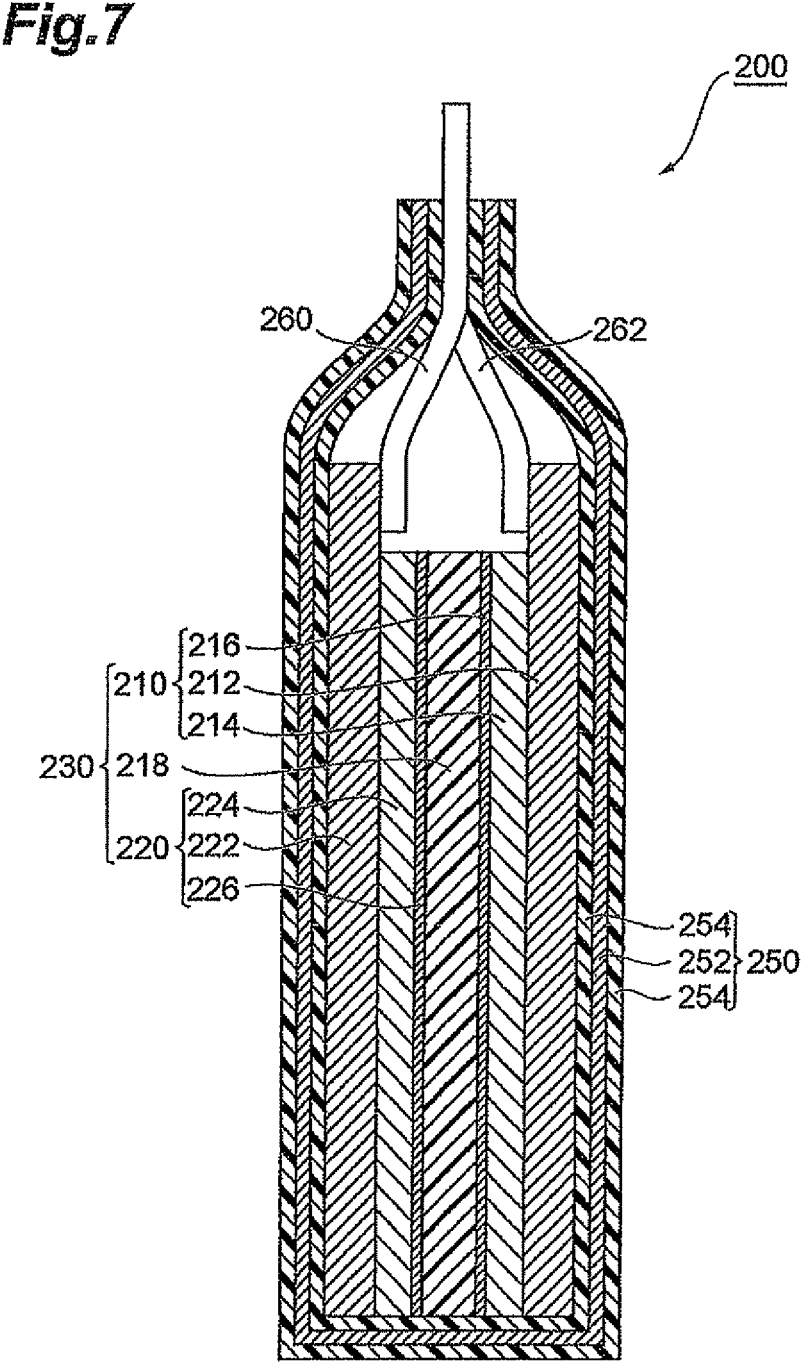
FIG. 7 is a schematic sectional view of the lithium ion secondary battery according to an embodiment of the invention.

A negative electrode was prepared in the same manner as in Example 4-1 except that use was made of the silicone resin particles having D50 and an aspect ratio shown in FIG. 7 manufactured by MOMENTIVE PERFORMANCE MATERIALS (more specifically, Example 4-2 employed a silicone resin particle obtained by classifying from TOSPEARL (trade name) and Examples 4-3 to 4-7 employed a silicone resin particle obtained by classifying from "XC99-A8808" (trade name).

Comparative Example 4-1

A negative electrode was prepared in the same manner as in Example 4-1 except that a negative electrode protecting layer having a thickness of 2.0 μm was formed of a polyethylene (PE) particle having D50:2.0 μm and an aspect ratio: 1.03 and obtained by classifying from Flow beads LE series (trade name, manufactured by Sumitomo Seika Chemicals Co., Ltd.) in place of the silicone resin particle.

Comparative Example 4-2

A negative electrode was prepared in the same manner as in Example 4-1 except that a negative electrode protecting layer having a thickness of 2.0 μm was formed of a PTFE particle (trade name "SST series" manufactured by SHAMROCK) having D50 of 2.0 μm and an aspect ratio of 1.03 in place of the silicone resin particle.

Comparative Example 4-3

A negative electrode was prepared in the same manner as in Example 4-1 except that a negative electrode protecting layer having a thickness of 2.0 to 4.0 μm was formed of an alumina particle (trade name: "AL series" manufactured by Sumitomo Chemical Co., Ltd.) having D50 of 2.0 μm and an aspect ratio of 1.86 in place of the silicone resin particle.

A positive electrode was prepared by forming a positive electrode active-material layer containing a positive electrode active-material particle ($LiCo_{1/3}Ni_{1/3}Mn_{1/3}O_2$: 44.5 parts by mass, and $LiMn_2O_4$: 44.5 parts by mass), a binder (PVDF: 5.0 parts by mass) and a conductive auxiliary (acetylene black:

3.0 parts by mass, and graphite: 3.0 parts by mass) on an aluminum collector. A lithium ion secondary battery was prepared using porous polyethylene as a separator, a 1M $LiPF_6$-containing PC/EC/DEC (the ratio (parts by volume) of 20:10:70) as an electrolytic solution and each of the electrodes obtained in the aforementioned Examples and Comparative Examples as a negative electrode.

<Rate Characteristics>

With respect to the lithium, ion secondary batteries obtained above, discharged capacity was measured at 1 C (the amount of current discharged for one hour when constant-current discharge is performed at 25° C.) and at 5 C (the amount of current discharged for 0.2 hours when constant-current discharge is performed at 25° C.) and rate characteristics (discharged capacity at 5 C/discharged capacity 1 C) was obtained. The results are shown in Table 7.

<Overcharge Test>

Constant current charge was performed at 2 C. After the voltage reached 10 V, constant voltage charge was performed for 45 minutes. After the test, the state of the cell was visually observed (with respect to the presence or absence of cell burst due to melting or thermal decomposition). The results are shown in Table 7.

TABLE 7

|  | Material for protecting-layer particle | D50 [μm] | Aspect ratio | Thickness of protecting layer [μm] | Rate characteristics 5C/1C [%] | State of cell after overcharge test |
|---|---|---|---|---|---|---|
| Ex. 4-1 | Silicone resin | 2.0 | 1.03 | 2.0 | 58 | Not burst |
| Ex. 4-2 |  | 0.5 | 1.03 | 2.0 | 54 | Not burst |
| Ex. 4-3 |  | 4.0 | 1.03 | 4.0 | 54 | Not burst |
| Ex. 4-4 |  | 2.0 | 1.30 | 2.0 | 55 | Not burst |
| Ex. 4-5 |  | 2.0 | 1.50 | 2.0 | 48 | Not burst |
| Ex. 4-6 |  | 0.3 | 1.03 | 2.0 | 50 | Not burst |
| Ex. 4-7 |  | 6.0 | 1.03 | 6.0 | 48 | Not burst |
| Com. Ex. 4-1 | PE | 2.0 | 1.03 | 2.0 | 58 | Firing |
| Com. Ex. 4-2 | PTFE | 2.0 | 1.03 | 2.0 | 55 | Burst |
| Com. Ex. 4-3 | Alumina | 2.0 | 1.86 | 2.0~4.0 | 45 | Not burst |

What is claimed is:

1. A lithium ion secondary battery comprising
a pair of electrodes facing each other; and
a separator interposed between the electrodes,
wherein:
   at least one of the electrodes has a protecting layer, an active-material containing layer, and a collector sequentially from the separator;
   the protecting layer contains a silicone resin particle having at least one structural unit represented by $RSiO_{1.5}$ and $R_2SiO$; and
   R represents an alkyl group having 1 to 6 carbon atoms or a phenyl group.

2. The lithium ion secondary battery according to claim 1, wherein the silicone resin particle has an average particle size of 0.3 to 6.0 μm.

3. The lithium ion secondary battery according to claim 1, wherein the protecting layer has a thickness of 0.3 to 6.0 μm.

4. The lithium ion secondary battery according to claim 1, wherein an aspect ratio, which is a ratio of a major-axis length relative to a minor-axis length of the silicone resin particle is from 1.00 to 1.50.

5. The lithium ion secondary battery according to claim 1, wherein the silicone resin particle is a polymethylsilsesquioxane particle.

* * * * *